US011949173B2

(12) United States Patent
Kim et al.

(10) Patent No.: US 11,949,173 B2
(45) Date of Patent: Apr. 2, 2024

(54) ANTENNA SYSTEM MOUNTED ON VEHICLE

(71) Applicant: LG ELECTRONICS INC., Seoul (KR)

(72) Inventors: Changil Kim, Seoul (KR); Changwon Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/010,799

(22) PCT Filed: Aug. 25, 2020

(86) PCT No.: PCT/KR2020/011286
§ 371 (c)(1),
(2) Date: Dec. 15, 2022

(87) PCT Pub. No.: WO2022/045383
PCT Pub. Date: Mar. 3, 2022

(65) Prior Publication Data
US 2023/0238704 A1 Jul. 27, 2023

(51) Int. Cl.
*H01Q 1/46* (2006.01)
*H01Q 9/04* (2006.01)
*H01Q 1/32* (2006.01)

(52) U.S. Cl.
CPC ............. *H01Q 9/0421* (2013.01); *H01Q 1/46* (2013.01); *H01Q 1/3275* (2013.01)

(58) Field of Classification Search
CPC ...... H01Q 9/0421; H01Q 1/46; H01Q 1/3275; H01Q 9/0407; H01Q 19/005;
(Continued)

(56) References Cited

U.S. PATENT DOCUMENTS

2014/0062794 A1* 3/2014 Guo ........................ H01Q 5/378 343/700 MS
2015/0009087 A1* 1/2015 Lee .......................... H01Q 7/00 343/866
(Continued)

FOREIGN PATENT DOCUMENTS

CN 204885432 12/2015
CN 110611163 12/2019
(Continued)

OTHER PUBLICATIONS

PCT International Application No. PCT/KR2020/011286, International Search Report dated May 24, 2021, 5 pages.

*Primary Examiner* — Hai V Tran
*Assistant Examiner* — Michael M Bouizza
(74) *Attorney, Agent, or Firm* — LEE, HONG, DEGERMAN, KANG & WAIMEY

(57) ABSTRACT

An antenna system mounted on a vehicle, according to the present specification, is provided. The antenna system can include: a main radiator formed on an antenna board and configured to be electrically connected to a feeding part; and a parasitic radiator formed to be spaced a predetermined distance apart from the main radiator so that a signal from the main radiator is gap-coupled. The parasitic radiator is electrically connected to a ground through a ground connection part, the main radiator operates in a first mode, and the parasitic radiator can operate in a second mode.

20 Claims, 39 Drawing Sheets

(58) Field of Classification Search
CPC .... H01Q 1/2291; H01Q 1/241; H01Q 1/3241; H01Q 1/3291; H01Q 5/378; H01Q 9/42; H01Q 21/28
See application file for complete search history.

(56) References Cited

U.S. PATENT DOCUMENTS

| | | | | |
|---|---|---|---|---|
| 2019/0013585 | A1* | 1/2019 | Iida | H01Q 9/0435 |
| 2021/0305688 | A1* | 9/2021 | Kim | H01Q 1/02 |

FOREIGN PATENT DOCUMENTS

| | | |
|---|---|---|
| JP | 2014520448 | 8/2014 |
| KR | 100871919 | 12/2008 |
| KR | 20150022795 | 3/2015 |
| KR | 20150052172 | 5/2015 |

* cited by examiner

FIG. 5B

| No. | Function | | Frequency[MHz] | |
|---|---|---|---|---|
| 1 | D-ANT1 (TX/RX) | 4G, L/M/H | 617 ~ 960 | 1427 ~ 2700 |
| 2 | D-ANT2 (RX) | 4G, L/M/H | 617 ~ 960 | 1427 ~ 2700 |
| 3 | D-ANT3 (TX/RX) | 5G - L/M/H | 617 ~ 960 | 1427 ~ 5000 (n79) |
| 4 | D-ANT4 (RX) | 5G - L/M/H | 617 ~ 960 | 1427 ~ 5000 (n79) |
| 5 | ANT1 (RX) | 5G - M/H | - | 1427 ~ 4200 (n77) |
| 6 | ANT2 (RX) | 5G - M/H | - | 1427 ~ 4200 (n77) |
| 7 | RKE1 | - | 315 | 433 |
| 8 | RKE2 | - | 315 | 433 |
| 9 | Wi-Fi1 | - | 2400 ~ 2480 | 5150 ~ 5850 |
| 10 | Wi-Fi2 | - | 2400 ~ 2480 | 5150 ~ 5850 |
| 11 | V2X_1 | Main | - | 5.855 ~ 5.925 |
| 12 | V2X_2 | MIMO (Option) | - | 5.855 ~ 5.925 |
| 13 | GNSS | L1 | - | 1559.0 ~ 1605.9 |
| 14 | GNSS | L2 (High) | 1196.9 ~ 1250.7 | - |
| 15 | SDARS | - | 2320 ~ 2345 | - |

| Name | X | Y |
|---|---|---|
| m1 | 433.0000 | -11.6183 |
| m2 | 315.0000 | -6.4231 |

(a)

[Bottom View]

(b)

[Top View]

FIG. 15A

| | | | | | | |
|---|---|---|---|---|---|---|
| Antenna | RKE1 | RKE2 | D-ANT1 | D-ANT2 | D-ANT3 | D-ANT4 |
| Lumped element | Series 15nH, Shunt 6.8nH, GND 15nH | Series 15nH, Shunt 6.8nH, GND 15nH | Series 100pF | Series 100pF | 1.5pF @ T strip | Series 100pF |
| Antenna | D-ANT5 | D-ANT6 | WiFi 1 | WiFi 2 | V2X_1 | V2X_2 |
| Lumped element | Series 3nH, Shunt 0.5pF | Series 3nH, Shunt 0.5pF | Series 100pF | Series 100pF | Series 100pF | Series 100pF |

(a)

(b)

ANTENNA SYSTEM MOUNTED ON VEHICLE

CROSS-REFERENCE TO RELATED APPLICATIONS

This application is the National Stage filing under 35 U.S.C. 371 of International Application No. PCT/KR2020/011286, filed on Aug. 25, 2020, the contents of which are all incorporated by reference herein in their entirety.

TECHNICAL FIELD

This specification relates to antenna system mounted on a vehicle. One particular implementation relates to an antenna system having a broadband antenna that is capable of operating in various communication systems, and to a vehicle having the same.

BACKGROUND ART

Electronic devices may be classified into mobile/portable terminals and stationary terminals according to mobility. In recent years, the electronic devices provide various services by virtue of commercialization of a wireless communication system using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle. However, broadband antennas such as cone antennas have problems in that a vertical profile and a weight increase due to an increase in an overall antenna size, particularly, a height.

In addition, the broadband antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange antennas having such a three-dimensional structure in a vehicle while maintaining a low interference level among the antennas.

In addition, it is necessary to improve antenna performance while maintaining a low-profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

Moreover, with such an antenna system being placed in a vehicle, multiple antennas may be disposed. Of these antennas, RKE (remote keyless entry) antennas are hard to operate in multiple bands. Another problem is that configuring LTE and 5G antennas to operate over a wide range including a mid band (MB) and a high band (HB) as well as a low band (LB).

DISCLOSURE OF INVENTION

Technical Problem

The present disclosure is directed to solving the aforementioned problems and other drawbacks. The present disclosure also describes performance improvement of an antenna system while maintaining a height of the antenna system mounted in a vehicle to be lower than or equal to a predetermined level.

The present disclosure further describes a structure for mounting an antenna system, which is capable of operating in a broad frequency band to support various communication systems, to a vehicle.

The present disclosure further describes a Remote Keyless Entry (RKE) antenna operating in multiple bands.

The present disclosure further describes an antenna structure optimized for an antenna element to operate in a broad frequency band in addition to an LB band.

Solution to Problem

To achieve these and other advantages and in accordance with the purpose of this specification, as embodied and broadly described herein, there is provided an antenna assembly mounted on a vehicle, the antenna system including: a main radiator formed on an antenna board and configured to be electrically connected to a feeding part; and a parasitic radiator formed to be spaced a predetermined distance apart from the main radiator so that a signal from the main radiator is gap-coupled, wherein the parasitic radiator is electrically connected to a ground through a ground connection part, the main radiator operates in a first mode, and the parasitic radiator can operate in a second mode.

According to an embodiment, the main radiator and the parasitic radiator may be formed in the form of rectangular patches that are spaced a predetermined distance apart from each other, and operate as a first RKE (remote keyless entry) antenna, wherein the first RKE antenna is formed on a first antenna substrate separated from a main board of the antenna system and disposed on one side, and operate in a first RKE band and a second RKE band.

According to an embodiment, the main radiator may include a first patch connected to the feeding part and a second patch connected to the first patch, and the parasitic radiator may include a third patch connected to the ground connection part.

According to an embodiment, a first side of the third patch may be spaced a predetermined distance apart from the first patch in a first direction, and a second side perpendicular to the first side of the third patch may be spaced a predetermined distance apart from the second patch in a second direction.

According to an embodiment, the ground connection part may include: a first connection part formed to be spaced a predetermined distance apart from the feeding part in the first direction; and a second connection part formed to be spaced a predetermined distance apart from the first patch in the second direction, wherein the second connection part is formed perpendicular to the first connection part.

According to an embodiment, the main radiator and the parasitic radiator may be formed from conductive lines that are spaced a predetermined distance apart from each other, and may operate as a second RKE antenna, wherein the second RKE antenna is formed on a second antenna board separated from a main board of the antenna system and disposed on one side, and operate in a second RKE band and a third RKE band.

According to an embodiment, the main radiator may be formed from a first conductive line connected to the feeding part, and the parasitic radiator may be formed from a second conductive line connected to the ground connection part, wherein the main radiator and the feeding part are connected to a serially-connected first inductor through a parallel-connected second inductor, and the parasitic radiator is connected to the ground through a serially-connected third inductor.

According to an embodiment, the first conductive line may include: a first coupling line formed perpendicular to the feeding part, and coupled to the second conductive line, spaced a predetermined distance apart from the same; and a first extended line formed perpendicular to the first coupling line, with some region being coupled to the second conductive line, wherein the length of the first conductive line is larger than the length of the second conductive line.

According to an embodiment, the second conductive line may include: a second coupling line formed perpendicular to the feeding part, and coupled to the first conductive line, spaced a predetermined distance apart from the same; and a first extended line formed perpendicular to the second coupling line, and coupled to the first extended line of the first conductive line, wherein the length of the second conductive line is smaller than the length of the first conductive line.

According to an embodiment, the antenna system may further include: a first dielectric structure disposed on the first antenna substrate, and formed in such a way that the height varies at a predetermined angle; a first radiator formed on one side and the front of the first dielectric structure; and a second radiator connected perpendicular to the main board, and configured to be spaced a predetermined distance apart from the first radiator, the first antenna including the first radiator and the second radiator operate in a 5G frequency band.

According to an embodiment, a ground of the main board and a ground of a side PCB where the first radiator and the second radiator are formed may be interconnected, and a ground pattern may be removed from a region where the main radiator of the first RKE antenna is disposed.

According to an embodiment, the antenna system may further include: a second dielectric structure disposed on the second antenna substrate, and formed in such a way that the height varies at a predetermined angle; a third radiator formed on one side and the front of the second dielectric structure; and a fourth radiator connected perpendicular to the main board, and configured to be spaced a predetermined distance apart from the third radiator, the second antenna including the third radiator and the fourth radiator operate in a 5G frequency band.

According to an embodiment, a ground of the main board and a ground of a side PCB where the third radiator and the fourth radiator are formed may be interconnected, and a ground pattern may be removed from a region where the second RKE antenna is disposed.

According to an embodiment, the antenna system may include: a first RKE antenna formed from a main radiator and a parasitic radiator which are in the form of rectangular patches on a first antenna substrate separated from a main board of the antenna system and disposed on one side; and a second RKE antenna formed from a main radiator and a parasitic radiator which are in the form of conductive lines on a second antenna substrate separated from the main board and disposed on the other side.

According to an embodiment, the antenna system may include: a first RKE antenna formed from a main radiator and a parasitic radiator which are in the form of conductive lines on a first antenna substrate separated from a main board of the antenna system and disposed on one side; and a second RKE antenna formed from a main radiator and a parasitic radiator which are in the form of conductive lines on a second antenna substrate separated from the main board and disposed on the other side.

According to an embodiment, the antenna system may further include: a feeding part formed on a main board of the antenna system; a strip line electrically connected to one side of the feeding part, and formed in a first-axis direction and a second-axis direction perpendicular to the first-axis direction; and a dielectric antenna formed by a metal pattern on a dielectric structure disposed on the main board, wherein a first metal pattern and a second metal pattern formed on the side of the dielectric structure are electrically connected to grounds in the vicinity of the feeding part and the strip line, respectively.

According to an embodiment, the dielectric antenna may include: a front metal pattern formed on the front of the dielectric structure; the first metal pattern formed on a first side protruding from the dielectric structure; and the second metal pattern formed on a second side of the dielectric structure.

According to an embodiment, the strip line may include: a first strip line of a predetermined width and a predetermined length formed in the first-axis direction; and a second strip line formed to extend a predetermined length in the second-axis direction corresponding to two opposite sides from an end of the first strip line.

According to an embodiment, the second metal pattern may be connected to the front metal pattern and formed in the form of a rectangular patch of a predetermined width and a predetermined length, an end of the rectangular patch connected to an end of the second metal pattern may be formed as a conductive line, and both sides of the conductive line may be formed as an inset structure which is formed by removing the metal pattern by a predetermined length and a predetermined width.

According to an embodiment, a conductive line corresponding to an end of the second metal pattern may be connected to an end of the first strip line through a capacitor.

According to an embodiment, the dielectric antenna may be a first dielectric antenna formed on one side separated from the main board, and placed adjacent to a first antenna operating in a 5G frequency band, wherein the first dielectric antenna operates as a PIFA (planar inverted F) antenna by a metal pattern formed on the front and side of the dielectric structure.

According to an embodiment, the dielectric antenna may further include a second dielectric antenna placed adjacent to the first dielectric antenna, with a loop-shaped front metal pattern formed on the front of the dielectric structure, wherein, in the second dielectric antenna, a feeding part electrically connected to one side of the front metal pattern is formed on a side inside the dielectric structure, and two opposite sides of the front metal pattern where the feeding part is not formed are electrically connected to a ground.

According to an embodiment, the dielectric antenna may be a third dielectric antenna formed on the other side separated from the main board, and placed adjacent to a second antenna operating in a 5G frequency band, wherein the third dielectric antenna operates as a PIFA (planar inverted F) antenna by a metal pattern formed on the front and side of the dielectric structure, and a V2X feeding part for feeding a V2X antenna is formed on the side of the dielectric structure where the first metal pattern and the second metal pattern are not formed.

According to an embodiment, the dielectric antenna may further include a fourth dielectric antenna placed adjacent to the third dielectric antenna, with a loop-shaped front metal pattern formed on the front of the dielectric structure, wherein, in the fourth dielectric antenna, a feeding part electrically connected to one side of the front metal pattern is formed on a side inside the dielectric structure, and two opposite sides of the front metal pattern where the feeding part is not formed are electrically connected to a ground.

According to an embodiment, the antenna system may further include an RKE antenna including: a main radiator formed on an antenna board and configured to be electrically connected to a feeding part; and a parasitic radiator formed to be spaced a predetermined distance apart from the main radiator so that a signal from the main radiator is gap-coupled, wherein the main radiator and the feeding part are connected to a serially-connected first inductor through a parallel-connected second inductor, and the parasitic radiator is connected to the ground through a serially-connected third inductor.

Advantageous Effects of Invention

Hereinafter, technical effects of an antenna system mounted on a vehicle and a vehicle equipped with the antenna system will be described.

According to an implementation, antenna performance of an antenna system mounted in a vehicle can be improved while maintaining a height of the antenna system to be a predetermined level or lower.

According to an implementation, a structure for mounting an antenna system, which can operate in a broad frequency band, to a vehicle can be provided to support various communication systems by implementing a low band (LB) antenna and other antennas in one antenna module.

According to an implementation, a gap-coupled RKE (remote keyless entry) antenna operating in multiple bands and a matching circuit for the same may be provided.

According to an implementation, an antenna structure optimized for an antenna element to operate over a wide range including other bands than a low band (LB), an optimized matching circuit, and a stub pattern may be provided.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF DRAWINGS

FIG. 5B illustrates functions and operating bands of a plurality of antennas in the structure of FIG. 5A.

FIG. 15A illustrates the inductance and capacitance of an impedance matching circuit of a plurality of antennas in an antenna system according to an embodiment.

MODE FOR THE INVENTION

Figure 1A:
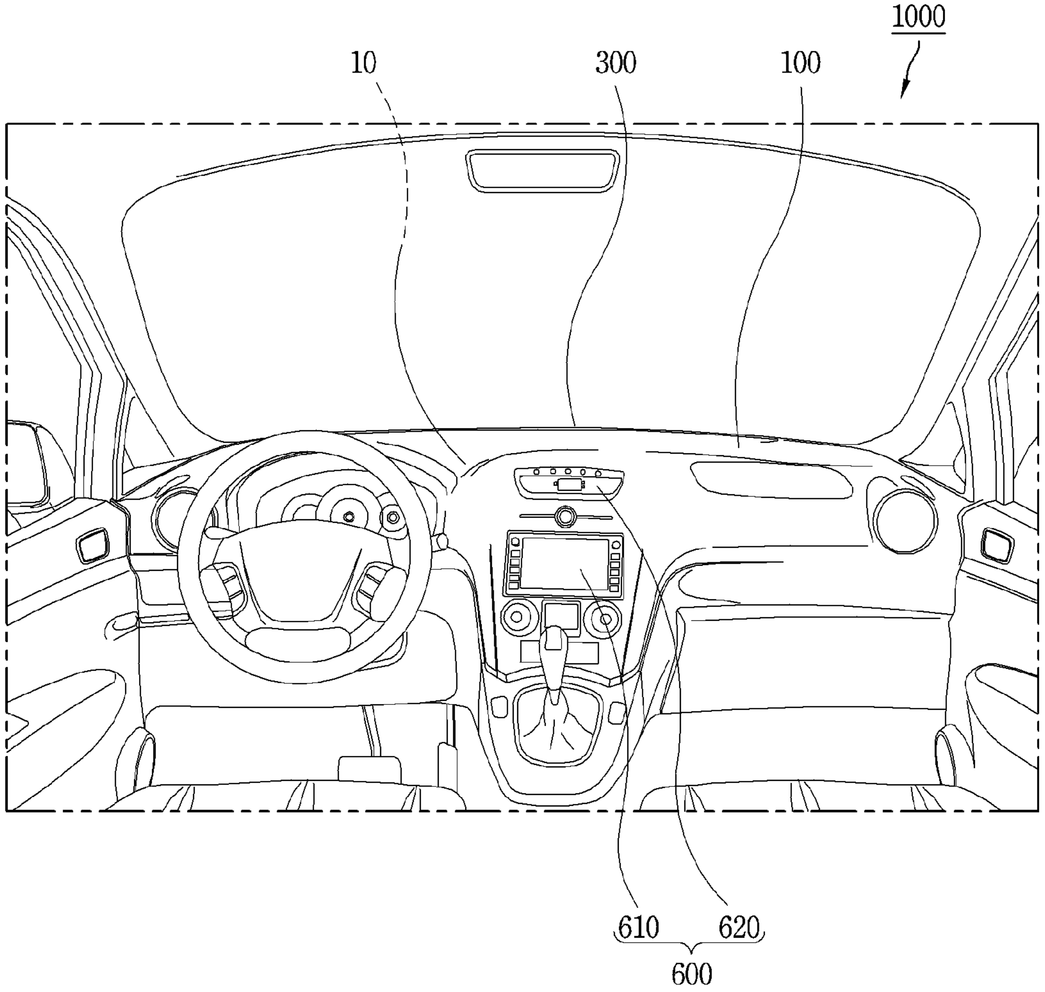
FIG. 1A is a diagram illustrating a vehicle interior in accordance with one example.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

An electronic device described herein may include a vehicle in addition to a mobile terminal. Therefore, wireless communication through the electronic device described herein may include wireless communication through the vehicle in addition to wireless communication through the mobile terminal.

Configuration and operations according to implementations described herein may also be applied to the vehicle in addition to the mobile terminal. Configurations and operations according to implementations may also be applied to a communication system, namely, antenna system mounted on the vehicle. In this regard, the antenna system mounted on the vehicle may include a plurality of antennas, and a transceiver circuit and a processor for controlling the plurality of antennas.

On the other hand, an antenna system mounted on a vehicle disclosed in this specification mainly refers to an antenna system disposed on an outside of the vehicle, but may also include a mobile terminal (electronic device) belonging to a user aboard the vehicle.

Figure 1B:
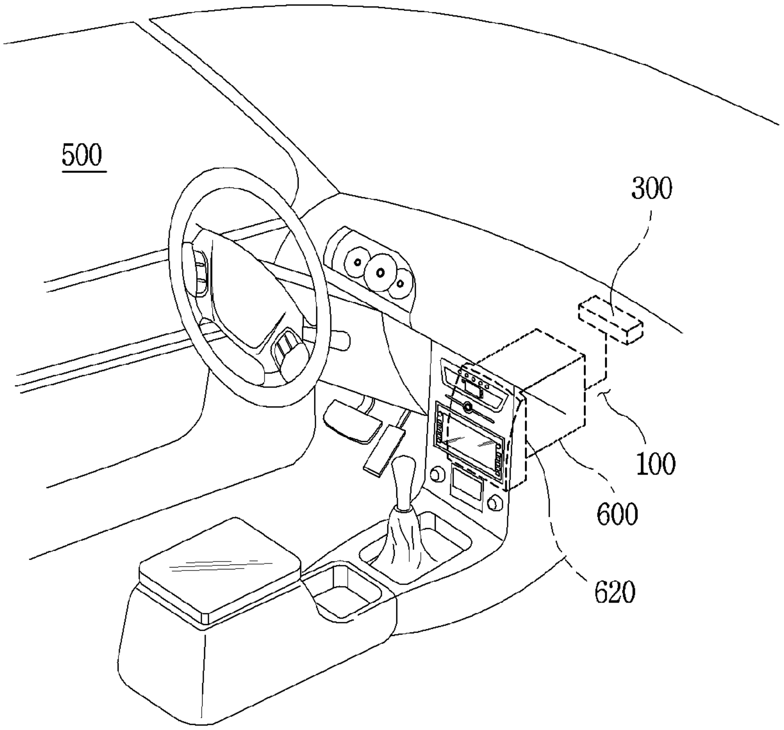
FIG. 1B is a diagram illustrating the vehicle interior in accordance with the one example, viewed from a side.

FIG. 1A is a diagram illustrating a vehicle interior in accordance with one example. FIG. 1B is a diagram illustrating the vehicle interior in accordance with the one example, viewed from a side.

As illustrated in FIGS. 1A and 1B, the present disclosure describes an antenna unit (i.e., an internal antenna system) 300 capable of transmitting and receiving signals through GPS, 4G wireless communication, 5G wireless communication, Bluetooth, or wireless LAN. Therefore, the antenna unit (i.e., the antenna system) 300 capable of supporting these various communication protocols may be referred to as an integrated antenna module 300.

The present disclosure also describes a vehicle 500 having the antenna unit 300. The vehicle 500 may include a housing including a dashboard and an antenna unit 300. In addition, the vehicle 500 may include a mounting bracket for mounting the antenna unit 300.

The vehicle 500 according to the present disclosure may include an antenna module 300 corresponding to an antenna unit and a telematics module (TCU) 600 configured to be connected to the antenna module 300. In one example, the telematics module 600 may be configured to include the antenna module 300. The telematics module 600 may include a display 610 and an audio unit 620.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may indicate the same meaning as V2X sidelink or NR V2X or may indicate a broader meaning including V2X sidelink or NR V2X.

V2X communication can be applied to various services, for example, forward collision warning, automatic parking system, Cooperative Adaptive Cruise Control (CACC), control loss warning, traffic queue warning, traffic vulnerable safety warning, emergency vehicle warning, speed warning when driving on a curved road, traffic flow control, and the like.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU is also a stationary infrastructure entity supporting V2X application programs, and can exchange messages with other entities that support V2X application programs. The RSU is a term frequently used in existing ITS specifications, and the reason for introducing this term to the 3GPP specifications is to make the documents easier to read for the ITS industry. The RSU is a logical entity that combines a V2X application logic with the functionality of an eNB (referred to as an eNB-type RSU) or a UE (referred to as a UE-type RSU).

V2I Service is a type of V2X service, where one party is a vehicle whereas the other party is an entity belonging to infrastructure. V2P Service is also a type of V2X service, where one party is a vehicle and the other party is a device carried by an individual (e.g., a handheld terminal carried by a pedestrian, a cyclist, a driver, or a passenger). V2X Service is a type of 3GPP communication service that involves a transmitting or receiving device on a vehicle. Based on the other party involved in the communication, it may be further divided into V2V service, V2I service and V2P service.

V2X enabled UE is a UE that supports V2X service. V2V Service is a type of V2X service, where both parties of communication are vehicles. V2V communication range is a direct communication range between two vehicles engaged in V2V service.

Figure 2A:
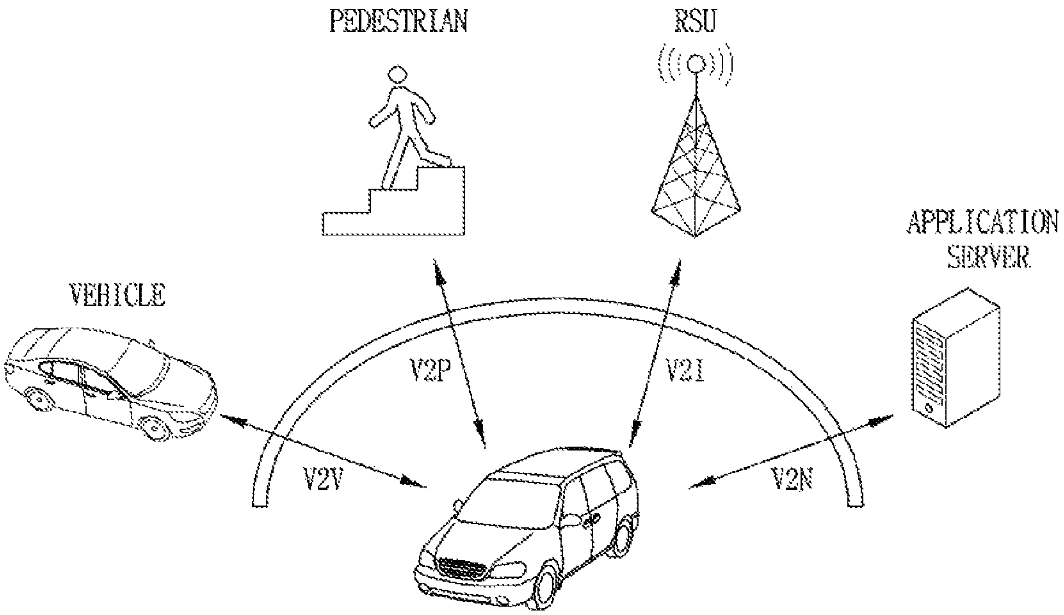
FIG. 2A is a diagram illustrating a type of V2X application.

V2X applications, referred to as Vehicle-to-Everything (V2X), include the four different types, as described above, namely, (1) vehicle-to-vehicle (V2V), (2) vehicle-to-infrastructure (V2I), (3) vehicle-to-network (V2N), (4) vehicle-to-pedestrian (V2P). FIG. 2A is a view illustrating a type of V2X application. Referring to FIG. 2A, the four types of V2X applications may use "cooperative awareness" to provide more intelligent services for end-users.

This means that entities, such as vehicles, roadside infrastructures, application servers and pedestrians, may collect knowledge of their local environments (e.g., information received from other vehicles or sensor equipment in proximity) to process and share that knowledge in order to provide more intelligent services, such as cooperative collision warning or autonomous driving.

<NR V2X>

Support for V2V and V2X services has been introduced in LTE during Releases 14 and 15, in order to expand the 3GPP platform to the automotive industry.

Requirements for support of enhanced V2X use cases are broadly arranged into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicles can increase the perception of their environment beyond of what their own sensors can detect and have a more broad and holistic view of the local situation. High data rate is one of the key characteristics.

(3) Advanced Driving enables semi-automated or full-automated driving. Each vehicle and/or RSU shares its own perception data obtained from its local sensors with vehicles in proximity and allows vehicles to synchronize and coordinate their trajectories or maneuvers. Each vehicle shares its driving intention with vehicles in proximity too.

(4) Remote Driving enables a remote driver or a V2X application to operate a remote vehicle for those passengers who cannot drive by themselves or remote vehicles located in dangerous environments. For a case where variation is limited and routes are predictable, such as in public transportation, driving based on cloud computing can be used. High reliability and low latency are the main requirements.

A description to be given below can be applied to all of NR SL (sidelink) and LTE SL, and when no radio access technology (RAT) is indicated, the NR SL is meant. Operation scenarios considered in NR V2X may be categorized into six as follows. In this regard, FIG. 2B illustrates a standalone scenario supporting V2X SL communication and an MR-DC scenario supporting V2X SL communication.

In particular, 1) in scenario 1, a gNB provides control/configuration for a UE's V2X communication in both LTE SL and NR SL. 2) In scenario 2, an ng-eNB provides control/configuration for a UE's V2X communication in both LTE SL and NR SL. 3) In scenario 3, an eNB provides control/configuration fora UE's V2X communication in both LTE SL and NR SL. On the other hand, 4) in scenario 4, a UE's V2X communication in LTE SL and NR SL is controlled/configured by Uu while the UE is configured with EN-DC. 5) In scenario 5, a UE's V2X communication in LTE SL and NR SL is controlled/configured by Uu while the UE is configured in NE-DC. 6) In scenario 6, a UE's V2X communication in LTE SL and NR SL is controlled/configured by Uu while the UE is configured in NGEN-DC.

Figure 2B:
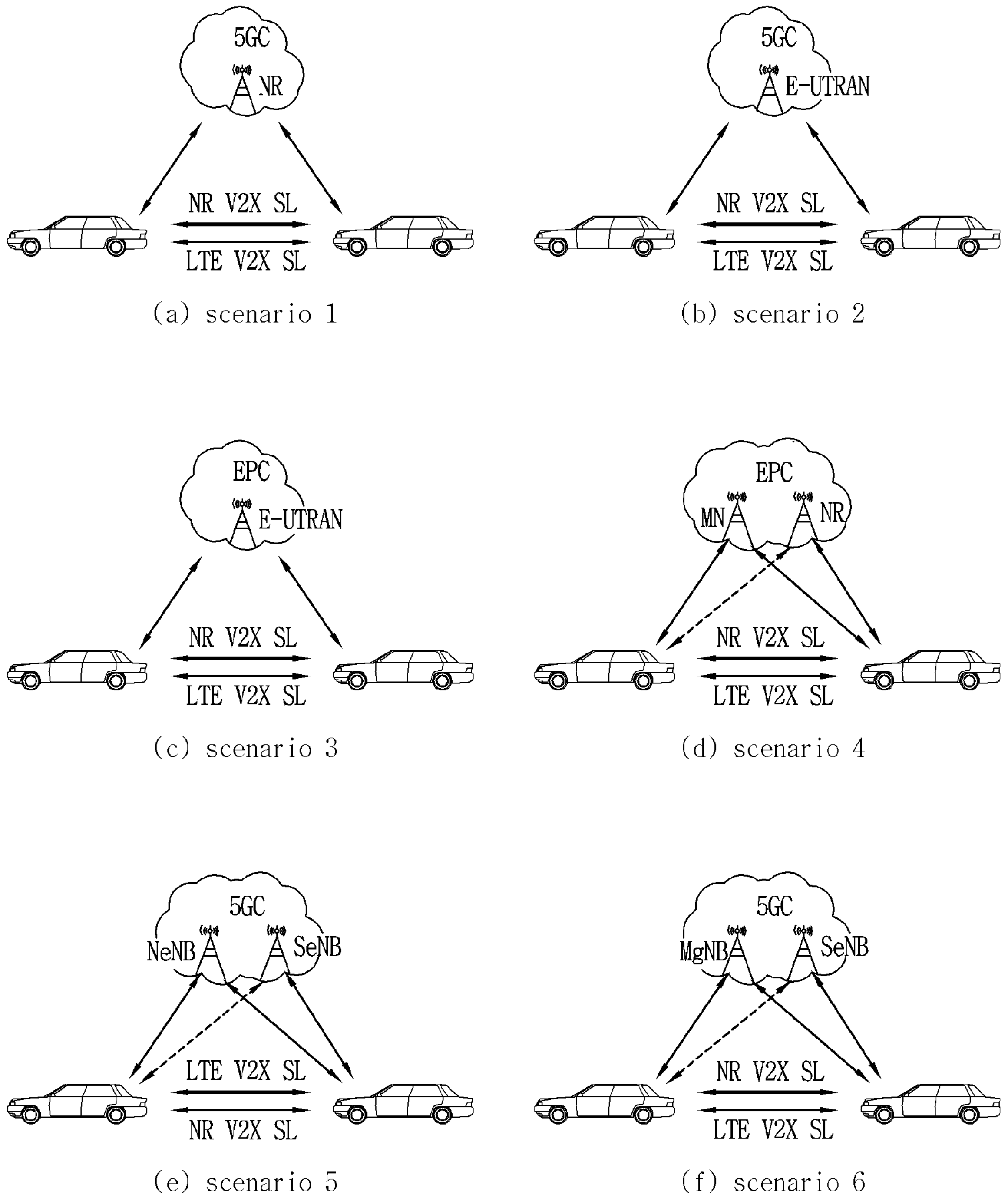
FIG. 2B illustrates a standalone scenario supporting V2X SL communication and an MR-DC scenario supporting V2X SL communication.

In order to support V2X communication, as illustrated in FIGS. 2A and 2B, a vehicle may perform wireless communication with an eNB and/or a gNB through an antenna system.

Figure 3A:
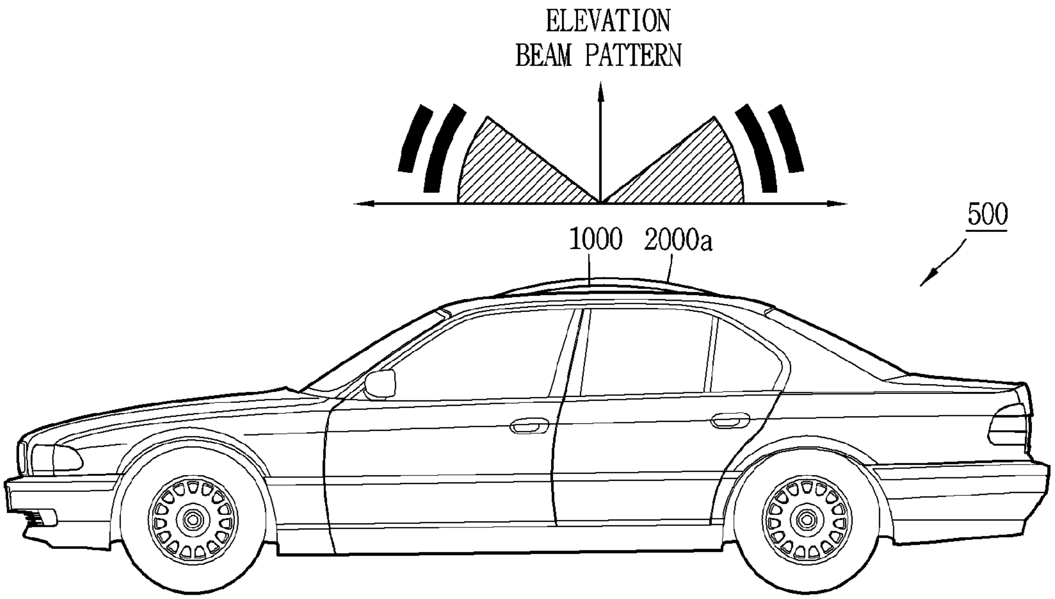
FIGS. 3A to 3C are views illustrating an example of a structure for mounting an antenna system on a vehicle, which includes the antenna system mounted on the vehicle.
Figure 3B:
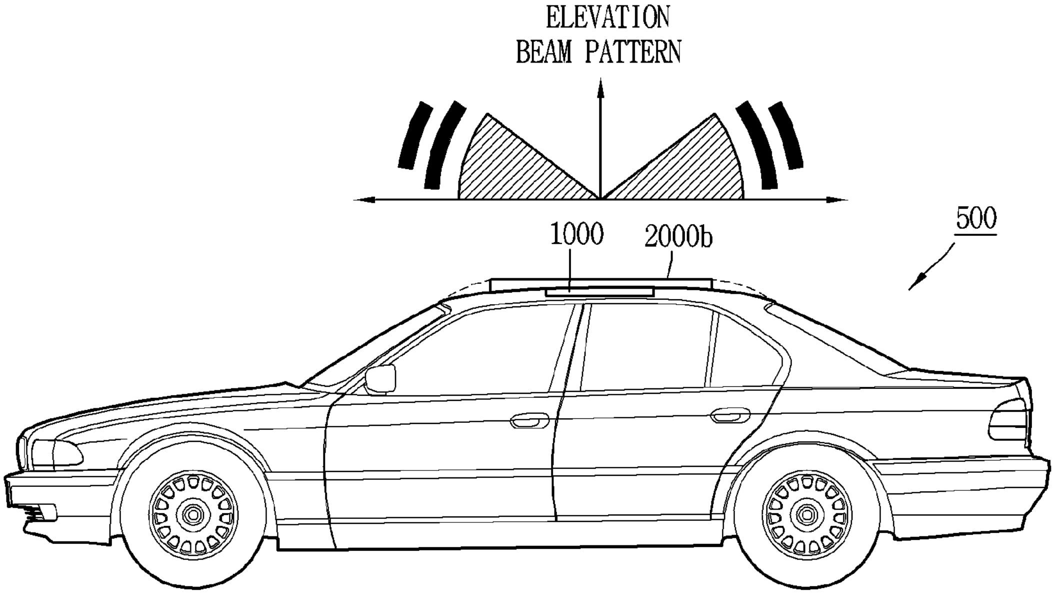
Figure 3C:
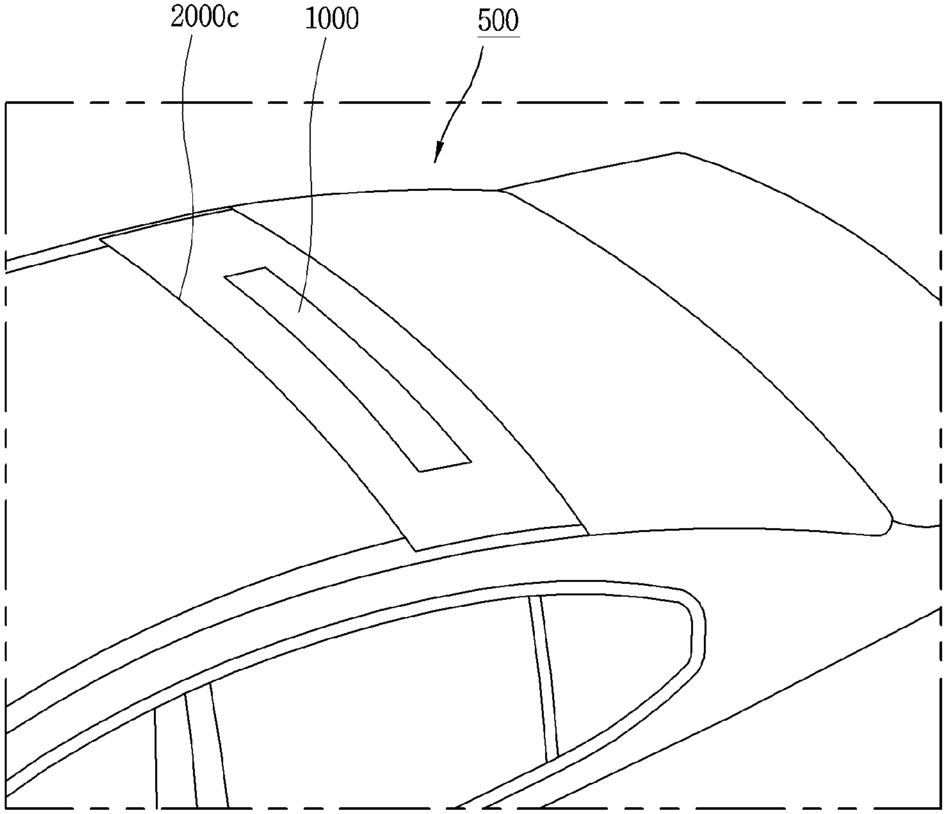

FIGS. 3A to 3C are views illustrating an example of a structure for mounting an antenna system in a vehicle, which includes the antenna system mounted in the vehicle. In this regard, FIGS. 3A and 3B illustrate a configuration in which an antenna system 1000 is mounted on or in a roof of a vehicle. Meanwhile, FIG. 3C illustrates a structure in which the antenna system 1000 is mounted on a roof of the vehicle and a roof frame of a rear mirror.

Referring to FIGS. 3A to 3C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 may be disposed on the roof of the vehicle. In FIG. 3A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to FIG. 3B, the antenna system 1000 may be disposed within a roof structure 2000*b* of the vehicle, and at least part of the roof structure 2000*b* may be made of a non-metallic material. At this time, the at least part of the roof structure 2000*b* of the vehicle may be realized as the non-metallic material, and may be made of a dielectric material through which radio signals are transmitted/received between the antenna system 1000 and the base station.

Also, referring to 3C, the antenna system 1000 may be disposed within a roof frame 2000*c* of the vehicle, and at least part of the roof frame 200*c* may be made of a non-metallic material. At this time, the at least part of the roof frame 2000*c* of the vehicle 500 may be realized as the non-metallic material, and may be made of a dielectric material through which radio signals are transmitted/received between the antenna system 1000 and the base station.

Meanwhile, referring to FIGS. 3A to 3C, a beam pattern by an antenna disposed in the antenna system 1000 mounted on the vehicle needs to be formed at an upper side by a predetermined angle in a horizontal region.

In this regard, the peak of an elevation beam pattern of the antenna disposed in the antenna system 1000 does not need to be formed at a bore site. Accordingly, the peak of the elevation beam pattern of the antenna needs to be formed at an upper side by a predetermined angle in the horizontal region. For example, the elevation beam pattern of the antenna may be formed in a hemispheric shape as illustrated in FIGS. 2A to 2C.

As aforementioned, the antenna system 1000 may be installed on the front or rear surface of the vehicle depending on applications, other than the roof structure or roof frame of the vehicle. In this regard, the antenna system 1000 may correspond to an external antenna.

Meanwhile, the vehicle 500 may include only an antenna unit (i.e., internal antenna system) 300 corresponding to an internal antenna without an antenna system 1000 corresponding to an external antenna. In addition, the vehicle 500 may include both the antenna system 1000 corresponding to the external antenna and the antenna unit (i.e., the internal antenna system) 300 corresponding to the internal antenna.

Figure 4A:
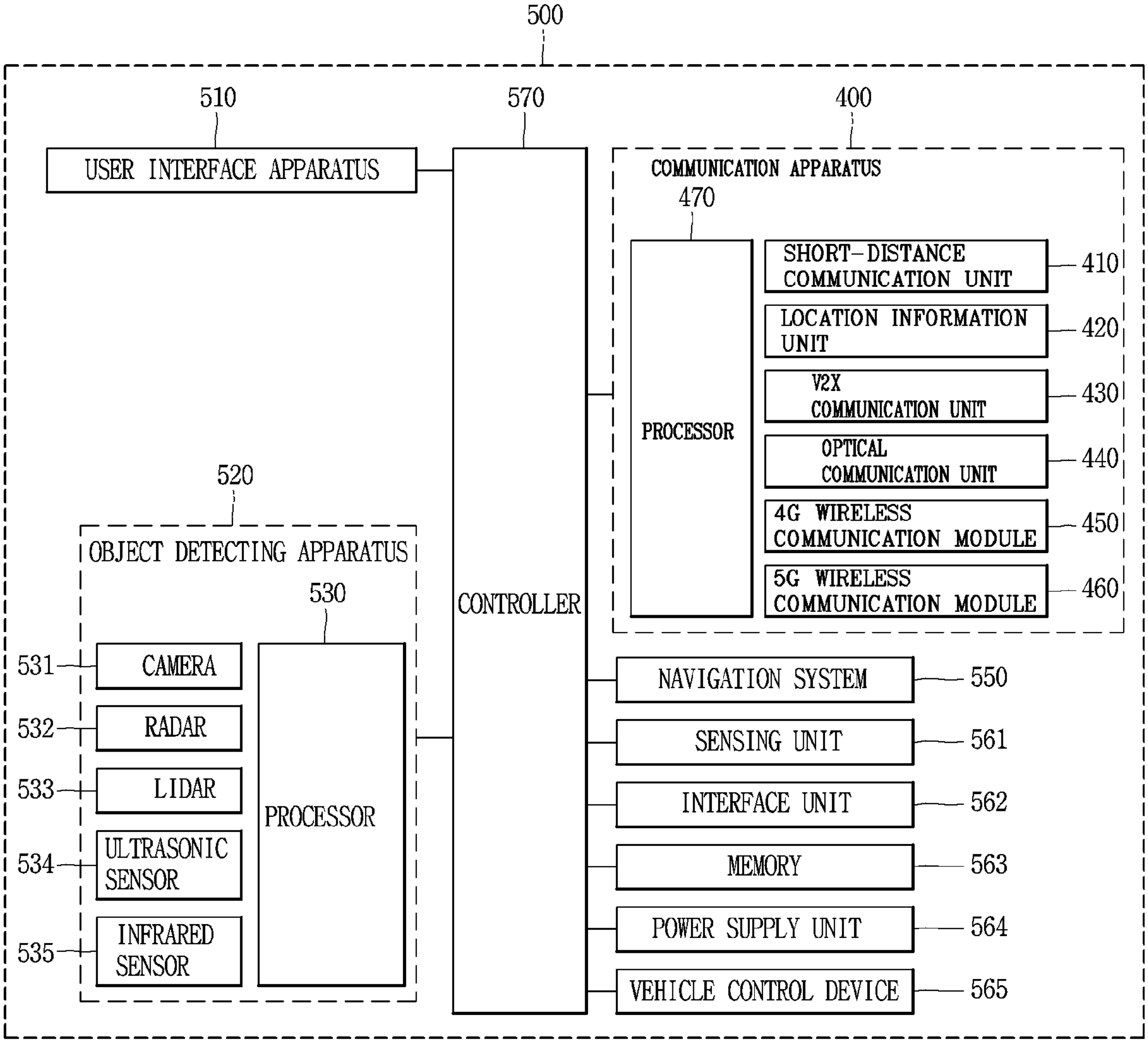
FIG. 4A is a block diagram illustrating a vehicle and an antenna system mounted to the vehicle in accordance with one implementation.

FIG. 4 is a block diagram illustrating a vehicle and an antenna system mounted on the vehicle in accordance with an implementation.

The vehicle 500 may be an autonomous vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics module mounted on the vehicle 500. Specifically, the telematics module mounted on the vehicle 500 may perform the operations in cooperation with the antenna module 300, the object detecting apparatus 520, and other interfaces. In some examples, the communication apparatus 400 may be disposed in the telematics module separately from the antenna system 300 or may be disposed in the antenna system 300.

The vehicle 500 may be switched into the autonomous driving mode or the manual mode based on driving environment information. The driving environment information may be generated based on object information provided from the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided from an external device.

When the vehicle 500 is driven in the autonomous driving mode, the autonomous vehicle 500 may be driven based on an operation system. For example, the autonomous vehicle 500 may be driven based on information, data or signal generated in a driving system, a parking exit system, and a parking system. When the vehicle 500 is driven in the manual mode, the autonomous vehicle 500 may receive a user input for driving through a driving control apparatus. The vehicle 500 may be driven based on the user input received through the driving control apparatus.

The vehicle 500 may include a user interface apparatus 510, an object detecting apparatus 520, a navigation system 550, and a communication apparatus 400. In addition, the vehicle may further include a sensing unit 561, an interface unit 562, a memory 563, a power supply unit 564, and a vehicle control device 565 in addition to the aforementioned apparatuses and devices. In some implementations, the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (UIs) or user experiences (UXs) through the user interface apparatus 200.

The object detecting apparatus 520 may be an apparatus for detecting an object located at outside of the vehicle 500. The object may be a variety of objects associated with driving (operation) of the vehicle 500. In some examples, objects may be classified into moving objects and fixed (stationary) objects. For example, the moving objects may include other vehicles and pedestrians. The fixed objects may include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as a calculation of a distance from the object, a calculation of a relative speed with the object and the like, through an image processing algorithm.

In some implementations, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a broadcast transceiver 450 and a processor 470. According to an implementation, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 is a unit for performing wireless communication with a server (Vehicle to Infra; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P. The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal. In some implementations, the light-emitting diode may be integrated with lamps provided on the vehicle 500.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network.

Here, the 4G base station and the 5G base station may have a Non-Stand-Alone (NSA) structure. The 4G base station and the 5G base station may be disposed in the Non-Stand-Alone (NSA) structure. Alternatively, the 5G base station may be disposed in a Stand-Alone (SA) structure at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, 5G and 4G networks may use the same frequency band, and this may be referred to as LTE re-farming. In some examples, a Sub 6 frequency band, which is a range of 6 GHz or less, may be used as the 5G frequency band. On the other hand, a millimeter-wave (mmWave) range may be used as the 5G frequency band to perform wideband high-speed communication. When the mmWave band is used, the electronic device may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In some implementations, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module 113.

Meanwhile, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Figure 4B:
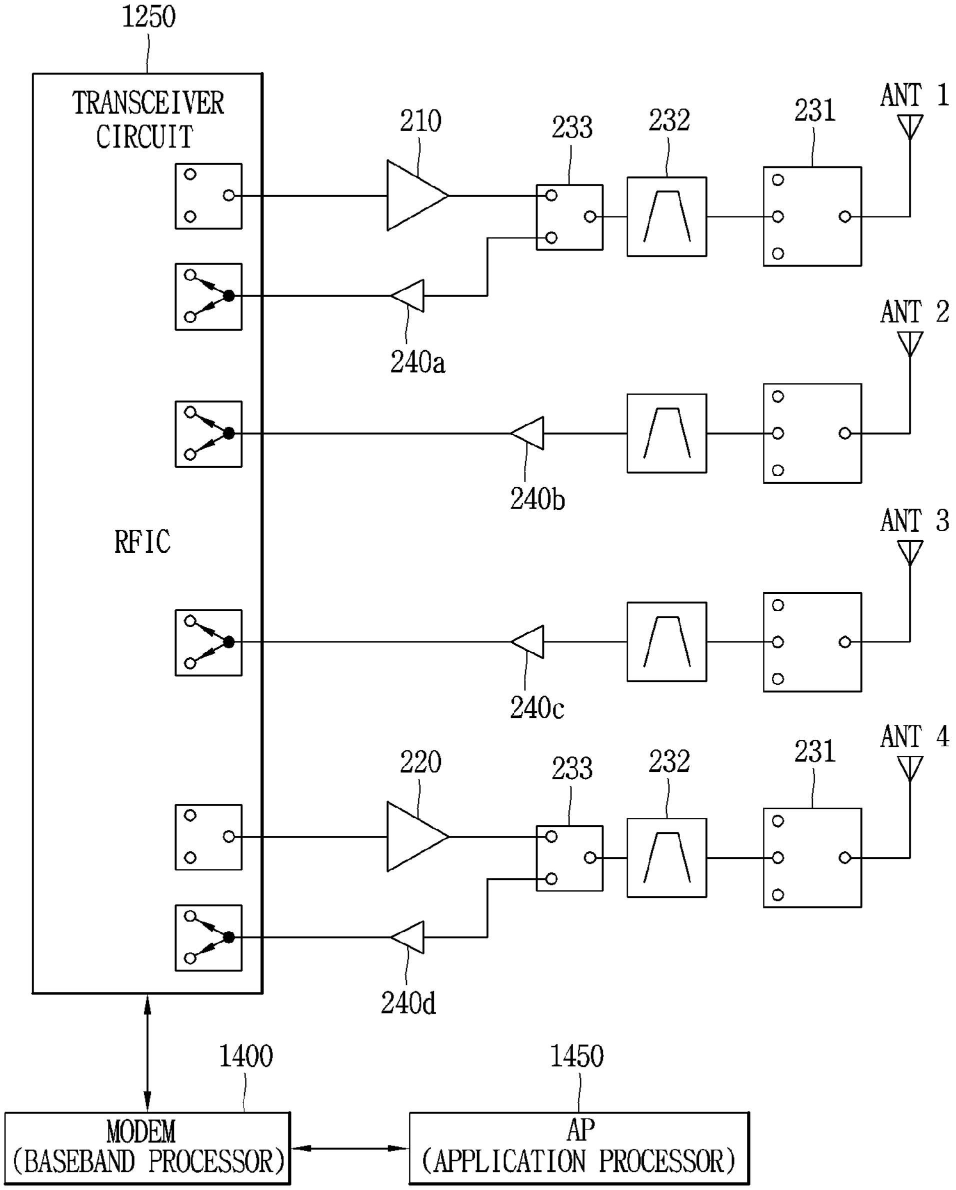
FIG. 4B is a block diagram illustrating an exemplary configuration of a wireless communication unit of a vehicle that can operate in a plurality of wireless communication systems.

FIG. 4B is a block diagram illustrating an exemplary configuration of a wireless communication unit of a vehicle that can operate in a plurality of wireless communication systems. Referring to FIG. 4B, the vehicle may include a first power amplifier 210, a second power amplifier 220, and an RFIC 1250. In addition, the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the vehicle may include a plurality of low noise amplifiers (LNAs) 210*a* to 240*a* in the receiver. Here, the first power amplifier 210, the second power amplifier 220, the RFIC 1250, and the plurality of low noise amplifiers 210*a* to 40*a* may all be operable in the first communication system and the second communication system. In this case, the first communication system and the second communication system may be a 4G communication system and a 5G communication system, respectively.

As illustrated in FIG. 4, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. Meanwhile, even when the RFIC 1250 is configured as the 4G/5G separate type, the 4G RFIC and the 5G RFIC may be logically and functionally separated but physically implemented in one chip as SoC (System on Chip). On the other hand, the application processor (AP) 1450 may be configured to control the operation of each component of the electronic device. Specifically, the application processor (AP) 1450 may control the operation of each component of the electronic device through the modem 1400.

Meanwhile, the first power amplifier 210 and the second power amplifier 220 may operate in at least one of the first and second communication systems. In this regard, when the 5G communication system operates in a 4G band or a Sub 6 band, the first and second power amplifiers 210 and 220 can operate in both the first and second communication systems. On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mm-Wave) band, first to fourth antennas ANT1 to ANT4 may be configured to operate in either one of the 4G band and the 5G band. In this case, when the 5G band is the millimeter wave (mmWave) band, each of the plurality of antennas may be configured as an array antenna in the millimeter wave band. Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL).

In addition, the vehicle that is operable in the plurality of wireless communication systems according to an implementation may further include a duplexer 231, a filter 232, and a switch 233. The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 210*a* and 240*a* through a second output port of the duplexer 231. The filter 232 may be configured to pass a signal in a transmission band or a reception band and to block a signal in a remaining band. The switch 233 may be configured to transmit only one of a transmission signal and a reception signal.

Meanwhile, the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit. The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the vehicle can be allocated resources or maintain a connected state through the eNB or gNB. In addition, the vehicle may perform at least one of V2V communication, V2I communication, and V2P communication with other entities through the allocated resources.

Figure 5A:
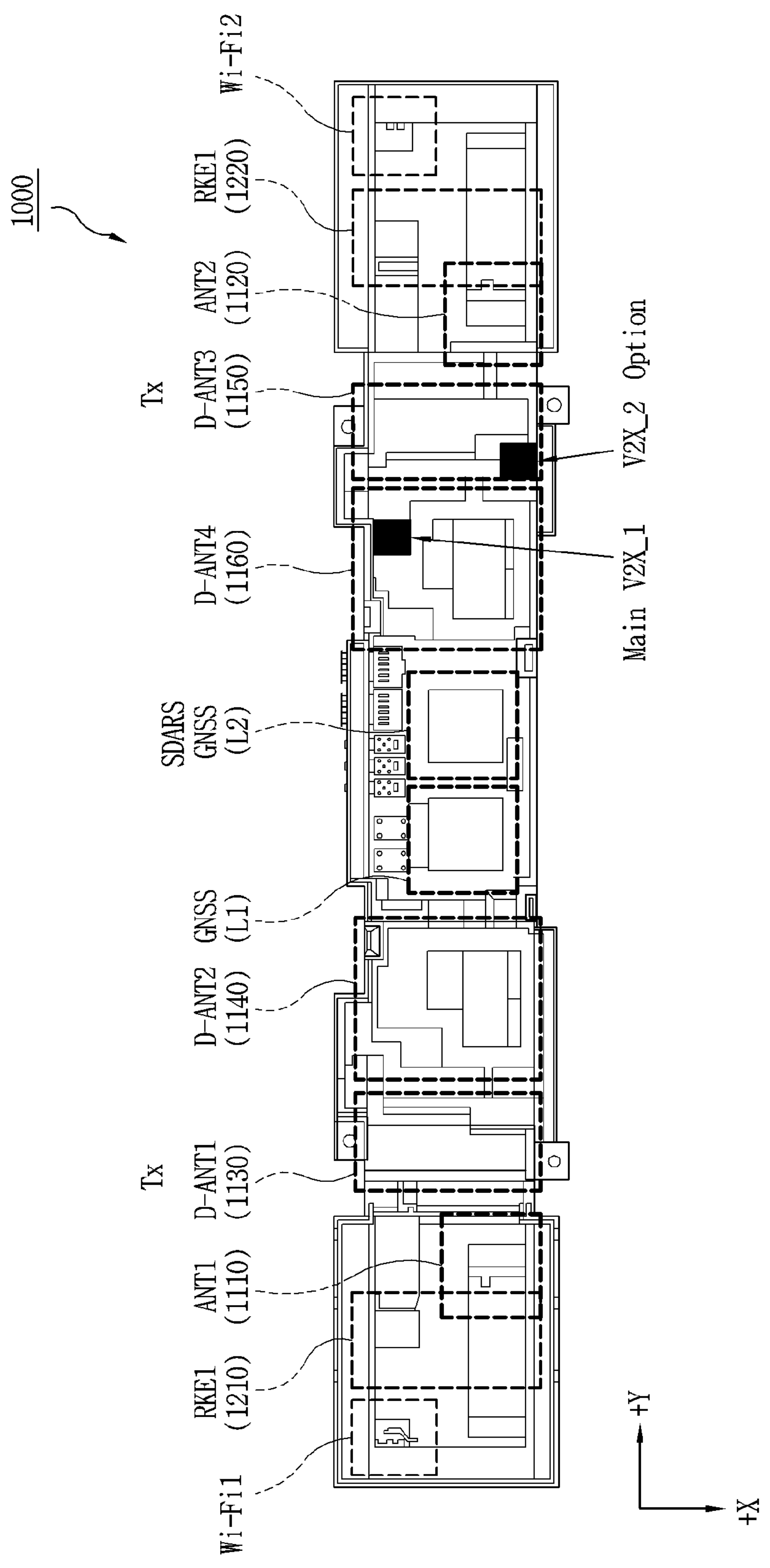
FIG. 5A illustrates a configuration structure of an antenna system according to an embodiment.
Figure 6:
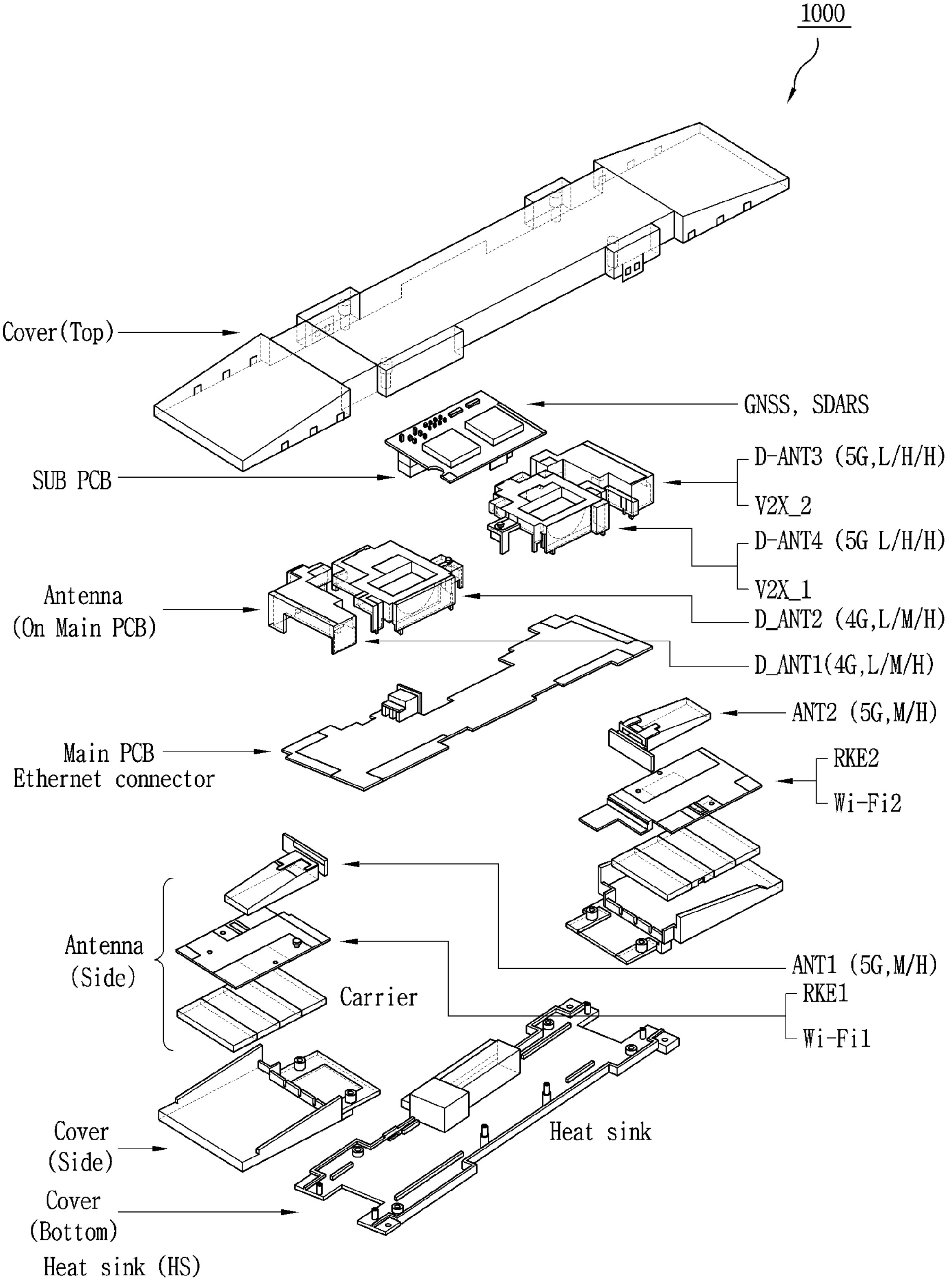
FIG. 6 illustrates an exploded view of an antenna system according to an embodiment.

Meanwhile, referring to FIG. 1A to FIG. 4B, an antenna system mounted on a vehicle may be placed over the roof of a vehicle, inside the roof, or inside a roof frame thereof. In relation to this, FIG. 5A illustrates a configuration structure of an antenna system according to an embodiment. FIG. 5B illustrates functions and operating bands of a plurality of antennas in the structure of FIG. 5A. FIG. 6 illustrates an exploded view of an antenna system according to an embodiment.

Referring to FIG. 5A to FIG. 6, the first antenna (ANT1) 1110 and the second antenna (ANT2) 1120 may be 5G antennas operating in a 5G frequency band. Specifically, the first antenna ANT1 and the second antenna ANT2 may be antennas that operate in a 5G mid band (MB) and a 5G high band (HB). The first antenna ANT1 and the second antenna ANT2 may be implemented as a metal pattern printed on a dielectric structure.

Broadband antennas operating in both the LTE frequency bands and the Sub6 frequency bands need to be disposed in a vehicle. However, broadband antennas such as cone antennas have problems in that a vertical profile and a weight increase due to an increase in an overall antenna size, particularly, a height.

In addition, the broadband antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle. This causes a problem that any detailed arrangement structure has not been taught to arrange antennas having such a three-dimensional structure in a vehicle while maintaining a low interference level among the antennas.

In addition, it is necessary to improve antenna performance while maintaining a low-profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

Moreover, with such an antenna system being placed in a vehicle, multiple antennas may be disposed. Of these antennas, RKE (remote keyless entry) antennas are hard to operate in multiple bands. Another problem is that configuring LTE and 5G antennas to operate over a wide range including a mid band (MB) and a high band (HB) as well as a low band (LB).

The present disclosure is directed to solving the aforementioned problems and other drawbacks. The present disclosure also describes performance improvement of an antenna system while maintaining a height of the antenna system mounted in a vehicle to be lower than or equal to a predetermined level. The present disclosure further describes a structure for mounting an antenna system, which is capable of operating in a broad frequency band to support various communication systems, to a vehicle. The present disclosure further describes a Remote Keyless Entry (RKE) antenna operating in multiple bands. The present disclosure further describes an antenna structure optimized for an antenna element to operate in a broad frequency band in addition to an LB band.

In relation to this, a first RKE antenna RKE1 and a second RKE antenna RKE2 have single resonance characteristics at a single frequency. For example, the first RKE antenna RKE1 and the second RKE antenna RKE2 have single resonance characteristics at a frequency band of 433 MHz. In relation to this, an RKE antenna needs to be implemented as a single antenna in a frequency band of 313.9 MHz<f<315.0 MHz and in a frequency band of 433.3 MHz<f<434.5 MHz. Thus, a dual band antenna design is required to implement an RKE antenna as a single antenna regardless of the country or vehicle in which it is used. Accordingly, the present disclosure proposes an RKE antenna structure that resonates in a dual mode over a wide range.

Moreover, it is important to ensure antenna performance in a high band (HB) out of 5G Sub 6 bands. In relation to this, there is a need to provide a communication service using an n79 band out of the 5G Sub 6 bands. However, in the case of 4G or 5G antennas, when implementing Low/Mid/High bands as a single antenna, improving performance to the n79 band may be very limited, or performance in other frequency bands may be degraded. To solve this problem, a wide-band matching structure is proposed which is applicable to an entire band for 5G antennas.

Therefore, the present disclosure proposes a structure for arranging a plurality of antennas as vehicle antennas, such as 4×4 MIMO, 2×2 DSDA, V2X, GPS, SDARS, Wi-Fi inside a TCU. In relation to this, there is a need to introduce a multi-band antenna design technique in order to reduce the number of antennas.

Figure 7A:
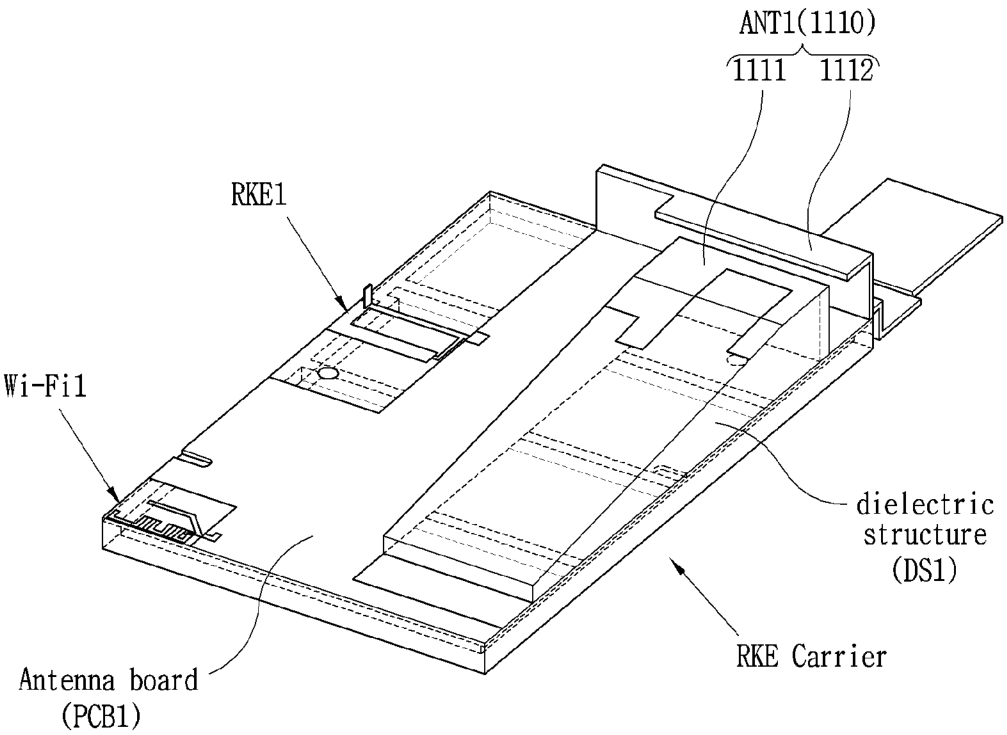
FIGS. 7A and 7B illustrate RKE antennas placed adjacent to 5G antennas formed on one side and the other side of an antenna system.
Figure 7B:
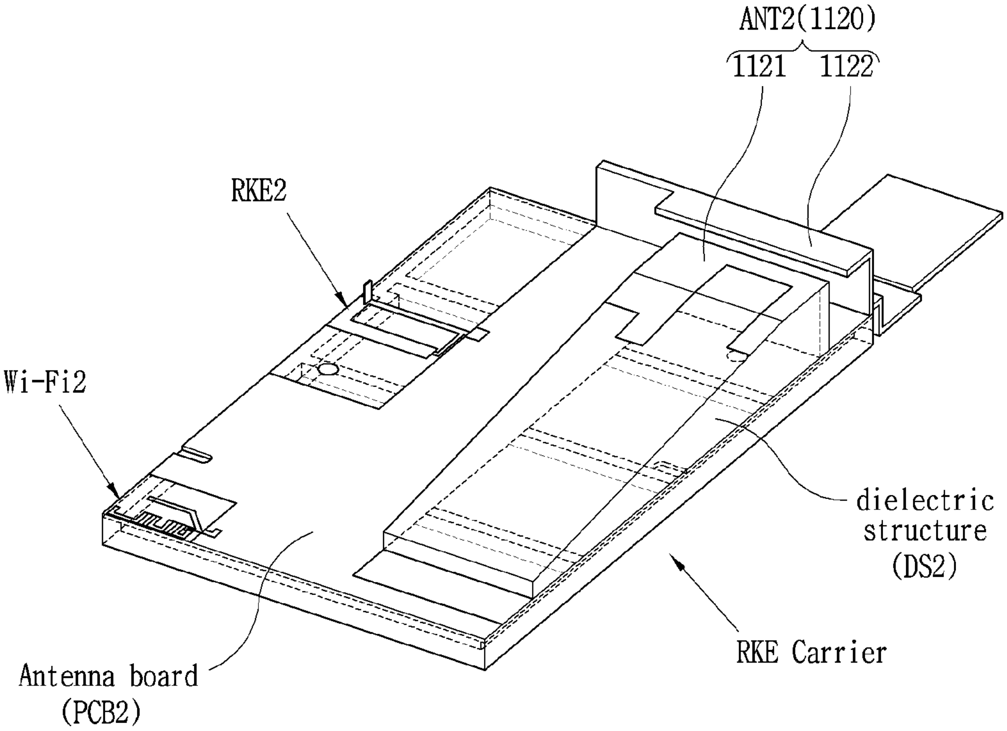
Figure 7C:
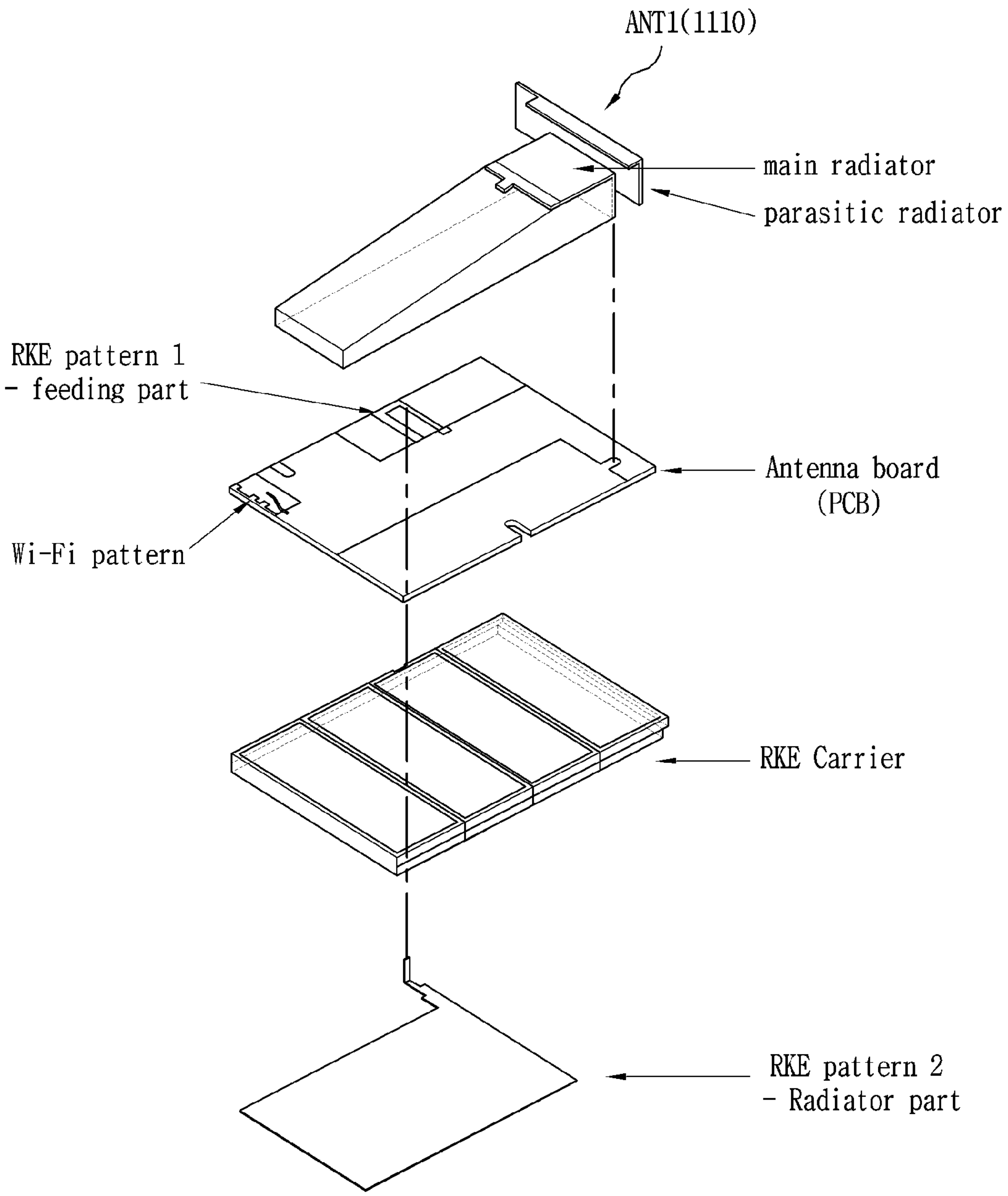
FIG. 7C illustrates an exploded view of an RKE antenna formed on an antenna board and a dielectric carrier according to an embodiment.

RKE (remote keyless entry) antennas may be formed on an antenna board, adjacent to the first antenna ANT1 and the second antenna ANT2 of FIG. 6. In relation to this, FIGS. 7A and 7B illustrate RKE antennas placed adjacent to 5G antennas formed on one side and the other side of an antenna system. FIG. 7C illustrates an exploded view of an RKE antenna formed on an antenna board and a dielectric carrier according to an embodiment.

FIG. 7A illustrates a first RKE antenna RKE1 placed adjacent to the first antenna (ANT1) 1110 formed on one side of the antenna system 1000. FIG. 7B illustrates a second RKE antenna RKE2 placed adjacent to the second antenna (ANT2) 1120 formed on the other side of the antenna system 1000. Moreover, referring to FIG. 7C, a feeding part formed on the antenna board PC and a radiator part formed on the dielectric carrier may operate as RKE antennas.

The first RKE antenna RKE1 and the second RKE antenna RKE2 shown in FIGS. 7A and 7B have single resonance characteristics at a single frequency. For example, the first RKE antenna RKE1 and the second RKE antenna RKE2 have single resonance characteristics at a frequency band of 433 MHz. In relation to this, an RKE antenna needs to be implemented as a single antenna in a frequency band of 313.9 MHz<f<315.0 MHz and in a frequency band of 433.3 MHz<f<434.5 MHz. Thus, a dual band antenna design is required to implement an RKE antenna as a single antenna regardless of the country or vehicle in which it is used. Accordingly, the present disclosure proposes an RKE antenna structure that resonates in a dual mode over a wide range.

Figure 8A:
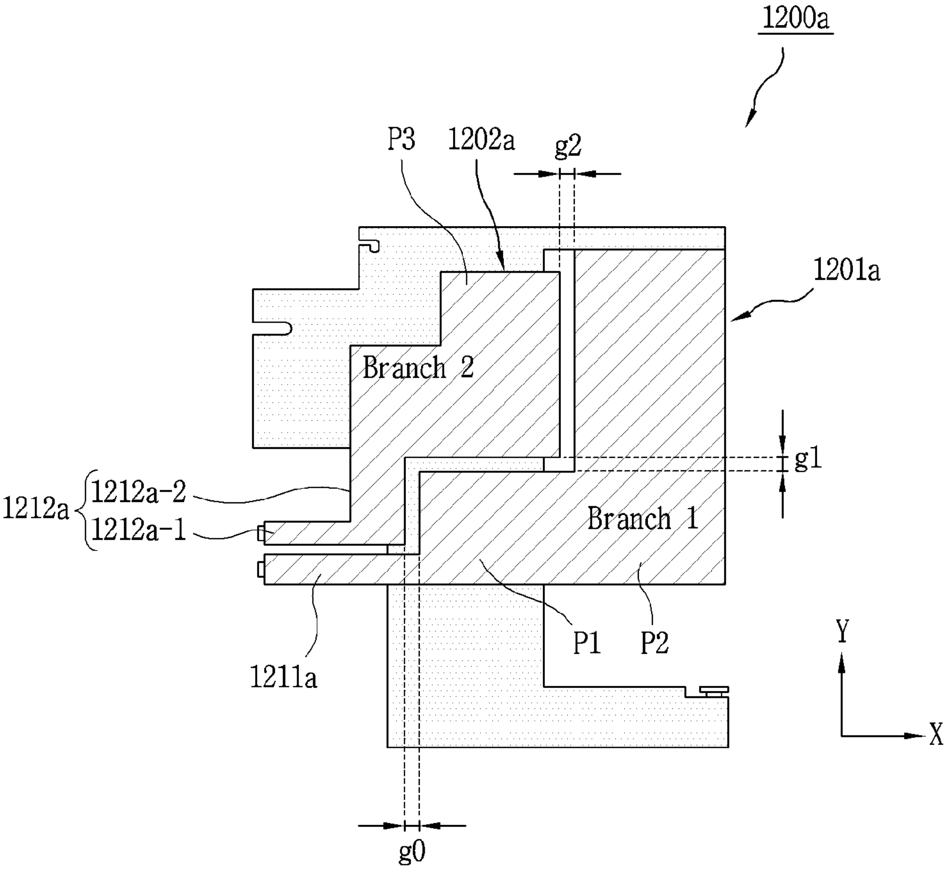
FIGS. 8A and 8B illustrate gap-coupled RKE antennas according to different embodiments.
Figure 8B:
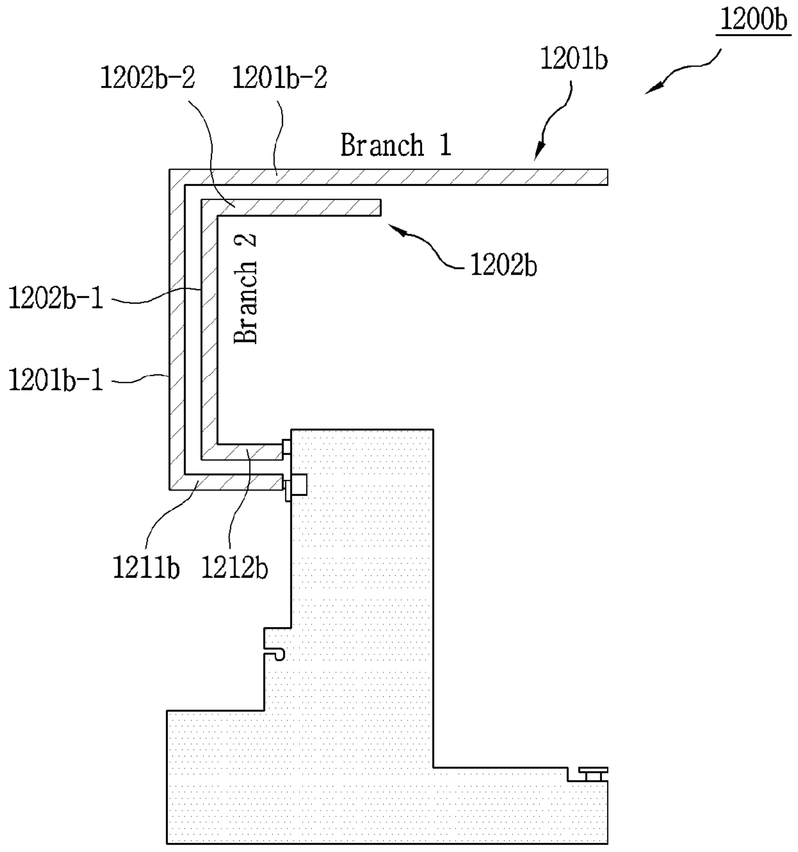

In relation to this, FIGS. 8A and 8B illustrate gap-coupled RKE antennas according to different embodiments. FIG. 8A illustrates an RKE antenna formed from a gap-coupled, planar patch antenna. FIG. 8B illustrates an RKE antenna formed from a gap-coupled, linear antenna. The planar antenna structure and linear antenna structure of FIGS. 8A and 8B may be referred to as type 1 and type 2, respectively.

Figure 8C:
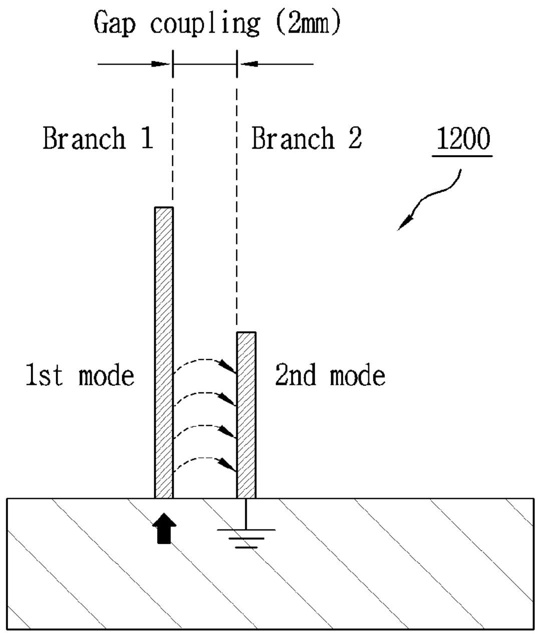
FIG. 8C illustrates a conceptual diagram of the gap-coupled RKE antennas of FIGS. 8A and 8B.
Figure 8D:
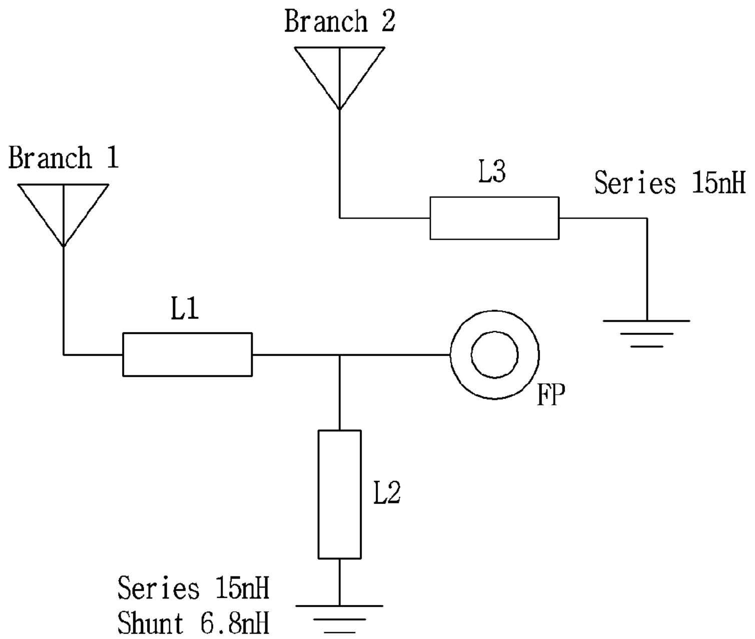
FIG. 8D illustrates a matching circuit structure for a gap-coupled RKE antenna.

Meanwhile, FIG. 8C illustrates a conceptual diagram of the gap-coupled RKE antennas of FIGS. 8A and 8B. FIG. 8D illustrates a matching circuit structure for a gap-coupled RKE antenna.

Referring to FIGS. 7C to 8D, the antenna system 1000 may include an RKE antenna 1200*a* and 1200*b* including a main radiator 1201*a* and 1201*b* and a parasitic radiator 1202*a* and 1202*b*. The main radiator 1201*a* and 1201*b* may be referred to as Branch 1, and the parasitic radiator 1202*a* and 1202*b* may be referred to as Branch 2. It may be assumed that Branch 1 corresponding to the main radiator 1201*a* and 1201*b* operates in a first mode. Also, it may be assumed that Branch 2 corresponding to the parasitic radiator 1202*a* and 1202*b* operates in a second mode. Accordingly, the RKE antenna 1200 operating in multiple modes, i.e., the first and second modes, may be configured to resonate in a dual mode over a wide range.

The main radiator 1201*a* and 1201*b* may be formed on the antenna board PCB and configured to be electrically connected to the feeding part 1211*a* and 1211*b*. The parasitic radiator 1202*a* and 1202*b* may be formed to be spaced a predetermined distance apart from the main radiator 1201*a* and 1201*b* so that a signal from the main radiator 1201*a* and 1201*b* is gap-coupled. The parasitic radiator 1202*a* and 1202*b* may be electrically connected to a ground through a ground connection part 1212*a* and 1212*b*. Meanwhile, the main radiator 1201*a* and 1201*b* may operate in the first mode, and the parasitic radiator 1202*a* and 1202*b* may operate in the second mode. Accordingly, the RKE antenna 1200*a* and 1200*b* operating in multiple modes, i.e., the first and second modes, may be configured to resonate in a dual mode over a wide range.

In relation to a Type 1 antenna structure, the main radiator 1201*a* and the parasitic radiator 1202*a* may be formed in the form of rectangular patches that are spaced a predetermined distance apart from each other, and operate as a first RKE antenna 1210. The first RKE antenna 1210 may be formed on a first antenna board PCB1 separated from a main board of the antenna system and disposed on one side, and operate in a first RKE band and a second RKE band.

The main radiator 1201*a* may include a first patch P1 connected to the feeding part 1211*a* and a second patch P2 connected to the first patch P1. Meanwhile, the parasitic radiator 1202*a* may include a third patch P3 connected to the ground connection part 1212*a*. Meanwhile, a first side of the third patch P3 may be spaced a predetermined distance g1 apart from the first patch P1 in a first direction, and a second side perpendicular to the first side of the third patch P3 may be spaced a predetermined distance g2 apart from the second patch P2 in a second direction. Here, the first direction and the second direction may be an an-axis direction and a y-axis direction, respectively, but are not limited thereto.

The ground connection part 1212*a* may be composed of a plurality of connection parts and maximize impedance matching and antenna characteristics. In relation to this, the ground connection part 1212*a* may include a first connection part 1212*a*-1 and a second connection part 1212*a*-2. The first connection part 1212*a*-1 may be formed to be spaced a predetermined distance apart from the feeding part 1211*a* in the first direction. The second connection part 1212*a*-2 may be formed to be spaced a predetermined distance g0 apart from the first patch P1 in the second direction. Here, the first direction and the second direction may be an an-axis direction and a y-axis direction, respectively, but are not limited thereto.

In relation to a Type 2 antenna structure, the main radiator 1201*b* and the parasitic radiator 1202*b* may be formed from conductive lines that are spaced a predetermined distance apart from each other, and operate as a second RKE antenna 1220. The second RKE antenna 1220 may be formed on a second antenna board PCB2 separated from a main board of the antenna system and disposed on one side, and operate in a second RKE band and a third RKE band.

The main radiator 1201*b* may be formed from a first conductive line connected to the feeding part 1211*b*. Meanwhile, the parasitic radiator 1202*b* may be formed from a second conductive line connected to the ground connection part 1212*b*. In relation to this, the first conductive line and the second conductive line may be formed only in one-axis direction without a bending structure, or may be formed as a bending structure.

In relation to this, the first conductive line 1201*b* may include a first coupling line 1201*b*-1 and a second extended line 1201*b*-2. Also, the second conductive line 1202*b* may include a second coupling line 1202*b*-1 and a second extended line 1202*b*-2.

The first coupling line 1201*b*-1 may be formed perpendicular to the feeding part 1211*b*, and may be coupled to the second conductive line 1202*b*, spaced a predetermined distance apart from it. Specifically, the first coupling line 1201*b*-1 may be coupled to the second coupling line 1202*b*-1, spaced a predetermined distance apart from it. The first extended line 1201*b*-2 may be formed perpendicular to the first coupling line 1201*b*-1, with some region being coupled to the second conductive line 1202*b*. Specifically, part of the length of the first extended line 1201*b*-2 may be coupled to the second extended line 1202*b*-2, spaced a predetermined distance apart from it. In relation to this, the length of the first conductive line 1201*b* may be larger than the length of the second conductive line 1202*b*.

The second coupling line 1202*b*-1 may be formed perpendicular to the ground connection part 1212*b*, and may be coupled to the first conductive line 1201*b*, spaced a predetermined distance apart from it. Specifically, the second coupling line 1202*b*-1 may be coupled to the first coupling line 1201*b*-1, spaced a predetermined distance apart from it. The second extended line 1202*b*-2 may be formed perpendicular to the second coupling line 1202*b*-1, and may be coupled to the first conductive line 1201*b*. Specifically, the second extended line 1202*b*-2 may be coupled to the first extended line 1201*b*-2 of the first conductive line 1201*b*, spaced a predetermined distance apart from it. In relation to this, the length of the second conductive line 1202*b* may be smaller than the length of the first conductive line 1201*b*.

Referring to FIGS. 8B to 8D, the first conductive line of the RKE antenna may have a matching circuit composed of a serial inductor L1 and a parallel inductor L2. For example, the first conductive line may be connected to a serial inductor L1 having an inductance value in a predetermined range with respect to 15 nH and a parallel inductor L2 having an inductance value in a predetermined range with respect to 6.8 nH. In relation to this, the serial inductor L1 allows for an increase in the electric length of the first conductive line, enabling operation in a low band. Also, the parallel inductor L2 may be disposed so that impedance matching takes place. The second conductive line of the RKE antenna may have a matching circuit composed of a serial inductor L3. For example, the second conductive line may be connected to a serial inductor L3 having an inductance value in a predetermined range with respect to 15 nH.

The RKE antenna may include a main radiator 1201*b* formed on an antenna board and configured to be electrically connected to a feeding part. The RKE antenna may further include a parasitic radiator 1202*b* formed to be spaced a predetermined distance apart from the main radiator 1201*b* so that a signal from the main radiator is gap-coupled. In relation to this, the main radiator 1201*b* and the feeding part may be connected to a serially-connected first inductor L1 through a parallel-connected second inductor L2. Meanwhile, the parasitic radiator 1202*b* may be connected to the ground through a serially-connected third inductor L3.

Figure 9A:
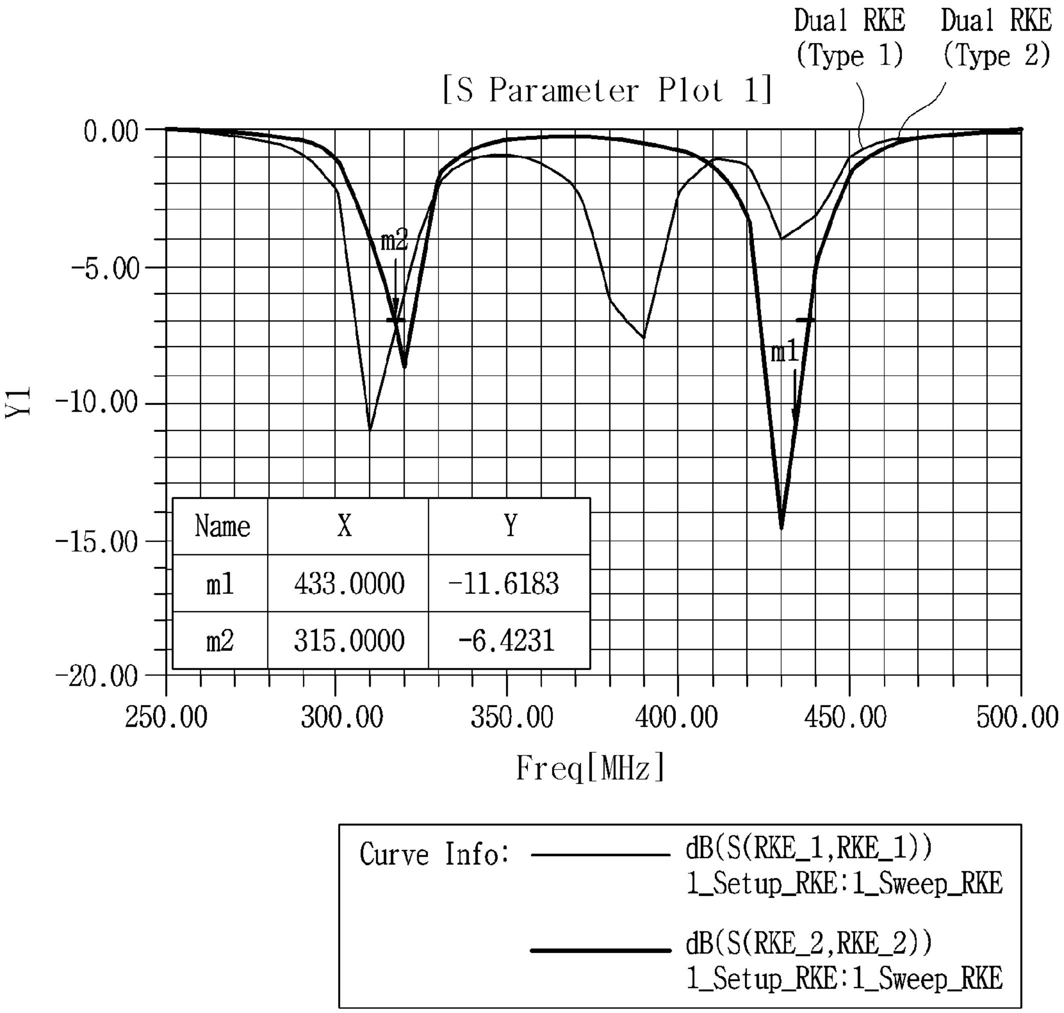
FIGS. 9A and 9B illustrate reflection coefficient characteristics and efficiency characteristics of RKE antennas having different antenna structures.
Figure 9B:
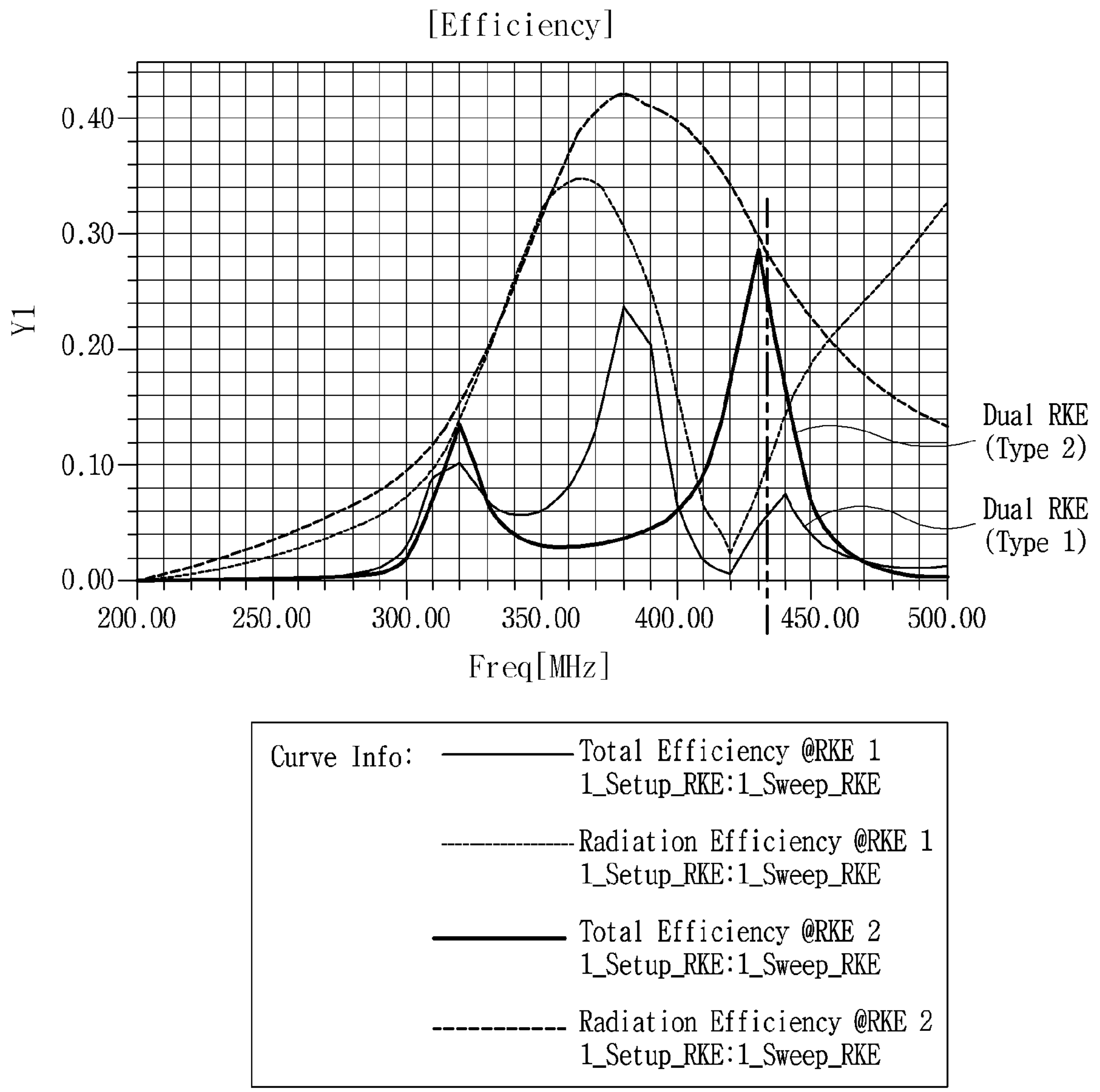

FIGS. 9A and 9B illustrate reflection coefficient characteristics and efficiency characteristics of RKE antennas having different antenna structures. FIG. 9A illustrates reflection coefficient characteristics of RKE antennas having type 1 and type 2 antenna structures. FIG. 9B illustrates efficiency characteristics of RKE antennas having type 1 and type 2 antenna structures.

Referring to FIGS. 8A to 9A, the first RKE antenna 1210 which is a type 1 antenna may operate to resonate in a dual mode in a first RKE band f1 and a second RKE band f2. Meanwhile, the second RKE antenna 1220 which is a type 2 antenna may operate to resonate in a dual mode in the first RKE band f1 and a third RKE band f3. In relation to this, the third RKE band f3 may be a higher frequency band than the second RKE band f2. Thus, the second RKE antenna 1220 which is a linear antenna structure may be configured to have a wider gap between the two bands than a planar antenna structure. In relation to this, one radiator may be made larger than another radiator while the linear antenna structure maintains a gap coupling between the different radiators.

Meanwhile, referring to FIG. 8A, FIG. 8B, and FIG. 9B, the second RKE antenna 1220 has the highest antenna efficiency characteristics in the third RKE band f3. In relation to this, the length of Branch 2 corresponding to the main radiator 1201*b* may be optimized while linear antenna structure maintains a gap coupling.

Figure 10:
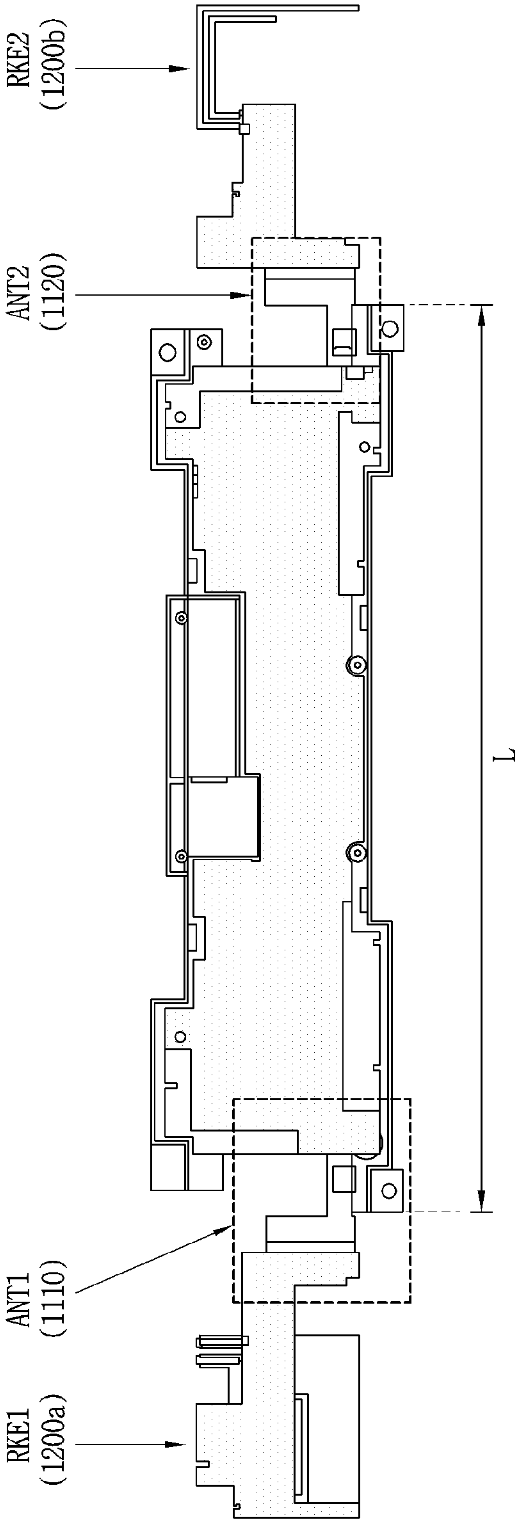
FIG. 10 illustrates an antenna system in which 5G antennas having a ground contact structure and RKE antennas of different types are disposed, according to an embodiment.

Meanwhile, referring to FIGS. 6 to 7C, the RKE antennas 1201 and 1202 disclosed in the present disclosure may be disposed on the same antenna substrates PCB1 and PCB2 as the first antenna (ANT1) 1110 and the second antenna (ANT2) 1120 which operate in a 5G frequency band. In relation to this, FIG. 10 illustrates an antenna system in which 5G antennas having a ground contact structure and RKE antennas of different types are disposed, according to an embodiment.

Referring to FIGS. 6 to 7C, FIG. 8A, FIG. 8B, and FIG. 10, the first antenna (ANT1) 1110 may include a first radiator 1111 and a second radiator 1112. Also, the first antenna (ANT1) 1110 may further include a first dielectric structure DS1. Meanwhile, the second antenna (ANT2) 1120 may include a third radiator 1121 and a fourth radiator 1122. Also, the second antenna (ANT2) 1120 may further include a second dielectric structure DS2.

The first dielectric structure DS1 may be disposed on the first antenna substrate PCB1, and formed in such a way that the height varies at a predetermined angle. The first radiator 1111 may be configured to be formed on one side and the front of the first dielectric structure DS1. The second radiator 1112 may be connected perpendicular to the main board of the antenna system. Also, the second radiator 1112 may be configured to be spaced a predetermined distance apart from the first radiator 1111. Thus, the first radiator 1111 may operate as a main radiator, and the second radiator 1112 may operate as a parasitic radiator, which may improve the bandwidth characteristics. Meanwhile, the first antenna (ANT1) 1110 including the first radiator 1111 and the second radiator 1112 may be configured to operate in a 5G frequency band.

Meanwhile, the ground of the main board and the ground of a side PCB where the first radiator 1111 and the second radiator 1112 are formed may be interconnected. In relation to this, the first radiator 1111 may be connected to a ground region of an antenna substrate PCB. Meanwhile, a ground pattern may be removed from a region where the main radiator of the first RKE antenna 1200*a* and 1210 is disposed.

The second dielectric structure DS2 may be disposed on the second antenna substrate PCB2, and its height may vary at a predetermined angle. The third radiator 1121 may be configured to be formed on one side and the front of the second dielectric structure DS2. The fourth radiator 1122 may be connected perpendicular to the main board of the antenna system. Also, the fourth radiator 1124 may be disposed to be spaced a predetermined distance apart from the third radiator 1121. Thus, the third radiator 1121 may operate as a main radiator, and the fourth radiator 1122 may operate as a parasitic radiator, which may improve the bandwidth characteristics. Meanwhile, the second antenna (ANT2) 1120 including the third radiator 1121 and the fourth radiator 1122 may be configured to operate in a 5G frequency band.

Meanwhile, the ground of the main board and the ground of a side PCB where the third radiator 1121 and the fourth radiator 1122 are formed may be interconnected. In relation to this, the third radiator 1121 may be connected to a ground region of an antenna substrate PCB. Meanwhile, a ground pattern may be removed from a region where the main radiator of the second RKE antenna 1200*b* and 1202 is disposed.

Referring to FIGS. 6 to 7C, FIG. 8A, FIG. 8B, and FIG. 10, the first RKE antenna 1200*a* corresponding to type 1 and the second RKE antenna 1200*b* corresponding to type 2 may be disposed on one side and the other side of the main board. The first RKE antenna 1200*a* may be formed from a main radiator and a parasitic radiator which are in the form of rectangular patches on the first antenna substrate PCB1 separated from the main board of the antenna system and disposed on one side. The second RKE antenna 1200*b* may be formed from a main radiator and a parasitic radiator which are in the form of conductive lines on the second antenna substrate PCB2 separated from the main board and disposed on the other side.

In relation to this, the first antenna (ANT1) 1110 disposed on the same antenna substrate PCB1 as the first RKE antenna 1200*a* may have a ground contact structure. The second antenna (ANT2) 1120 disposed on the same antenna substrate PCB2 as the second RKE antenna 1200*b* also may have a ground contact structure. Meanwhile, the RKE antennas 1200*a* and 1200*b* disclosed in the present disclosure may be configured to operate in a dual band mode by changing the ground connection structure between the main board and the side PCB and the ground pattern. Thus, as the ground connection structure between the main board and the side PCB and the ground pattern are changed, the RKE antennas 1200*a* and 1200*b* may resonate in a dual mode at 315 MHz and 433 MHz.

Figure 11A:
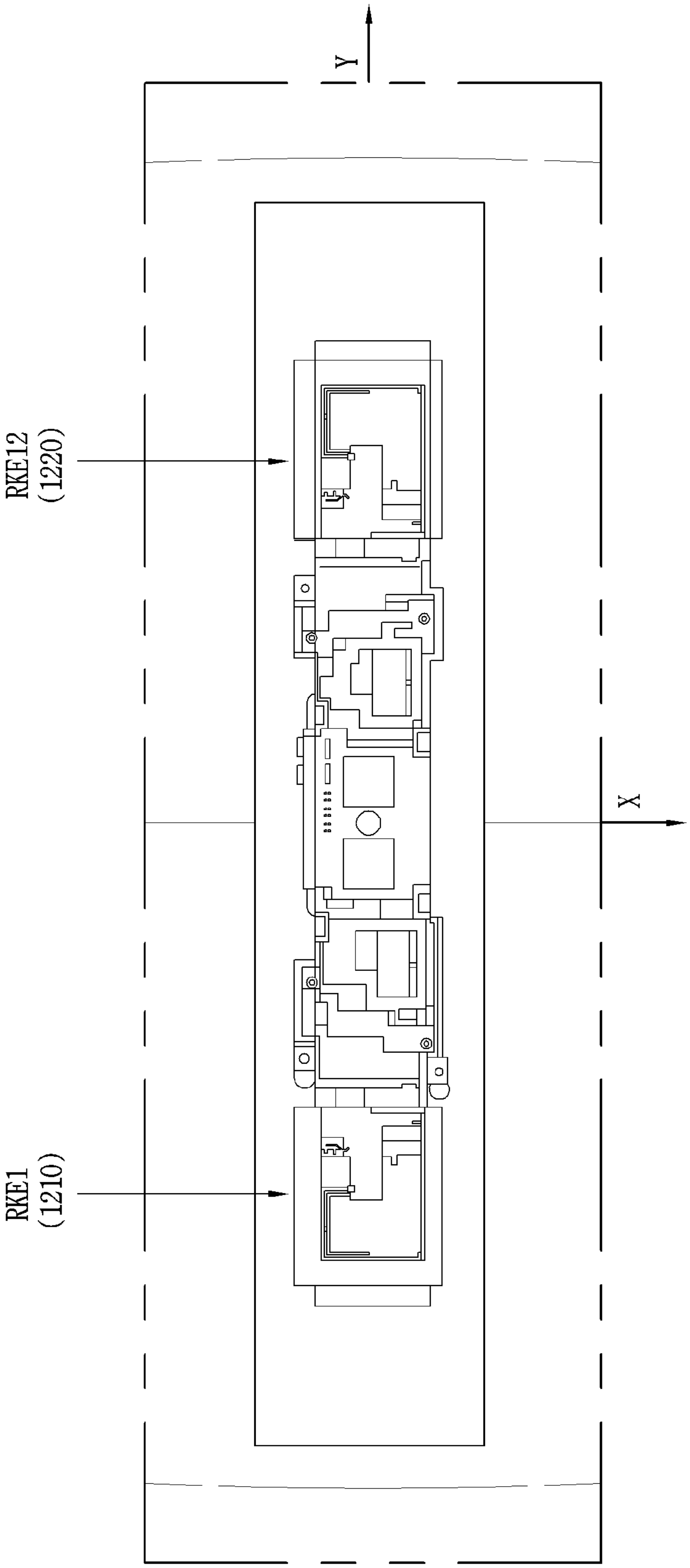
FIG. 11A illustrates a configuration in which RKE antennas of the same type are disposed on one side and the other side of the main board of the antenna system.
Figure 11B:
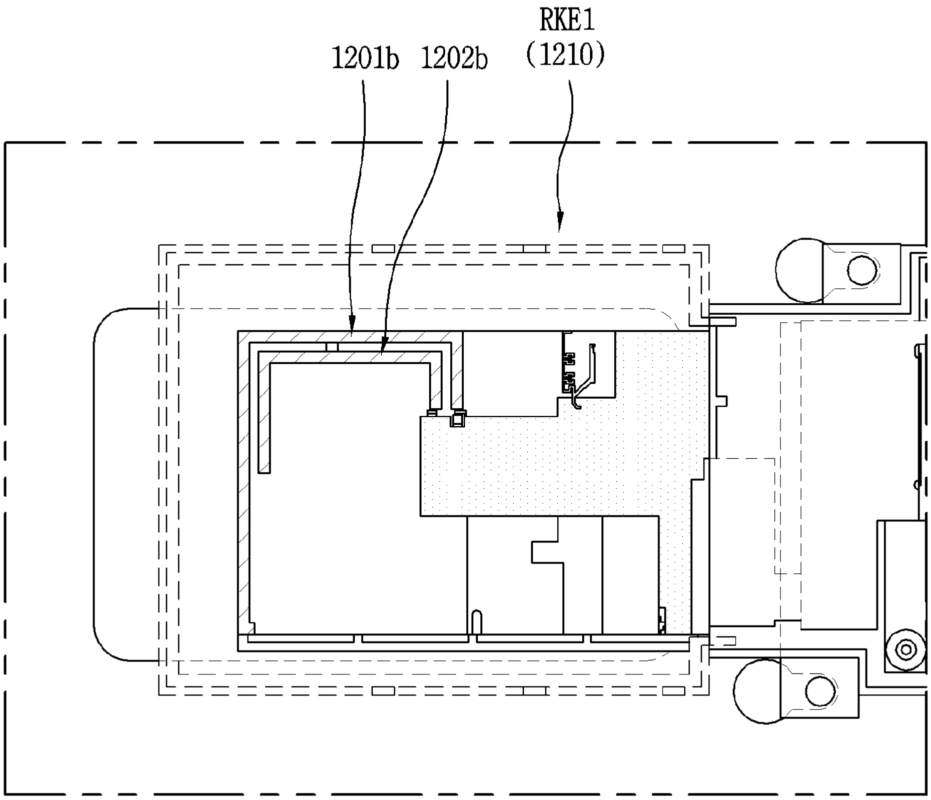
FIG. 11B illustrates a configuration of an RKE antenna to which a conductive line of type 2 is coupled.

Meanwhile, the RKE antennas disclosed in the present disclosure may be disposed as antennas of the same type on one side and the other side of the main board. In relation to this, FIG. 11A illustrates a configuration in which RKE antennas of the same type are disposed on one side and the other side of the main board of the antenna system. Meanwhile, FIG. 11B illustrates a configuration of an RKE antenna to which a conductive line of type 2 is coupled. Although FIGS. 11A and 11B present RKE antennas 1210 and 1220 to which a conductive line of type 2 is coupled, but not limited thereto. For example, they may be configured as an RKE antenna to which a metal patch of type 1 is coupled.

Figure 12A:
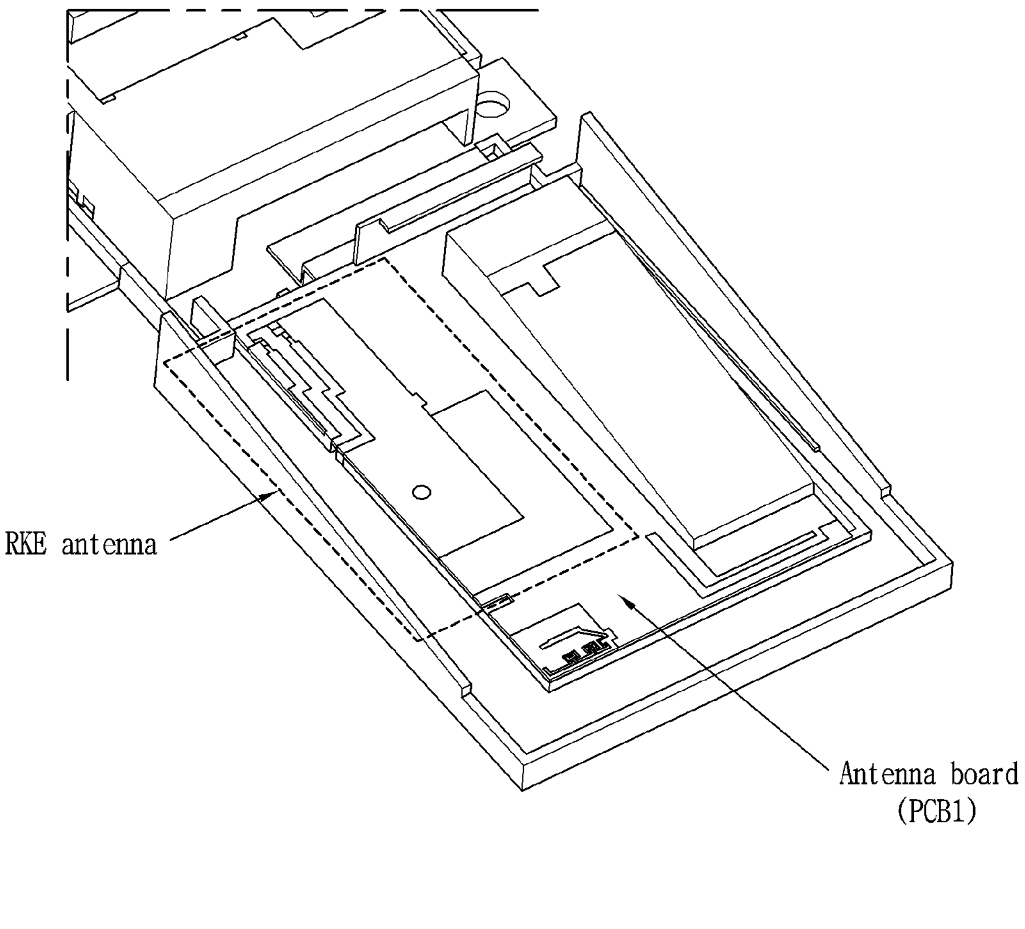
FIG. 12A illustrates a configuration of an antenna substrate in an antenna system where the ground of the main board and the ground of a side PCB are connected.
Figure 12B:
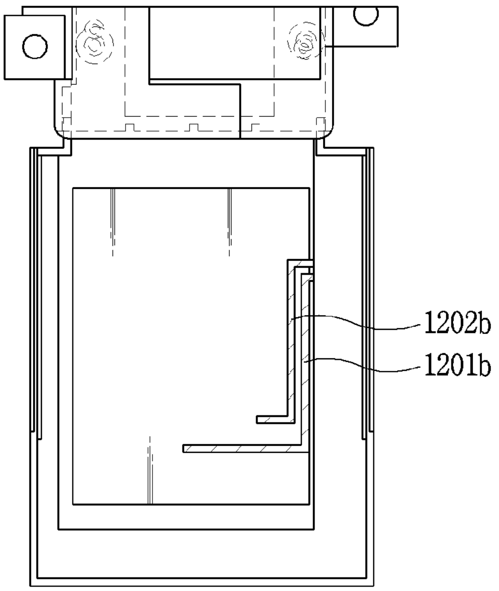
FIG. 12B illustrates the shapes of a feeding part, a ground connection part, and a conductive line which are formed on the front and back of an antenna substrate.
Figure 12B:
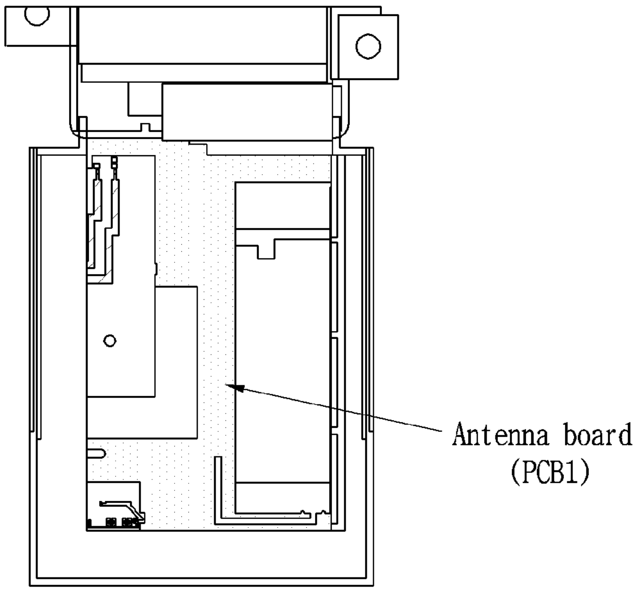

FIG. 12A illustrates a configuration of an antenna substrate in an antenna system where the ground of the main board and the ground of a side PCB are connected. Meanwhile, FIG. 12B illustrates the shapes of a feeding part, a ground connection part, and a conductive line which are formed on the front and back of an antenna substrate.

Referring to FIG. 6, FIG. 8B, FIG. 8C, and FIGS. 11A to 12B, the antenna system 1000 may include a corresponding first RKE antenna 1210 and a corresponding second RKE antenna 1220. In relation to this, the first RKE antenna 1210 and the second RKE antenna 1220 may be configured in the form of coupled conductive lines 1201*b* and 1202*b*.

The first RKE antenna 1210 may be formed from a main radiator 1201*b* and a parasitic radiator 1202*b* which are in the form of a conductive line on the first antenna substrate PCB1 separated from the main board of the antenna system and disposed on one side. The second RKE antenna 1220 may be formed from a main radiator 1201*b* and a parasitic radiator 1202*b* which are in the form of a conductive line on the second antenna substrate PCB2 separated from the main board of the antenna system and disposed on the other side.

In relation to a Type 2 antenna structure, the main radiator 1201*b* and the parasitic radiator 1202*b* may be formed from conductive lines spaced a predetermined distance apart from each other, and may operate as the first RKE antenna 1210. The first RKE antenna 1210 may be formed on the first antenna substrate PCB1 separated from the main board of the antenna system and disposed on one side, and may operate in the first RKE band and the third RKE band.

Moreover, the main radiator 1201*b* and the parasitic radiator 1202*b* may be formed from conductive lines spaced a predetermined distance apart from each other, and may operate as the second RKE antenna 1220. The second RKE antenna 1220 may be formed on the second antenna substrate PCB2 separated from the main board of the antenna system and disposed on one side, and may operate in the first RKE band and the third RKE band.

The main radiator 1201*b* may be formed from a first conductive line connected to the feeding part 1211*b*. Meanwhile, the parasitic radiator 1202*b* may be formed from a second conductive line connected to the ground connection part 1212*b*. In relation to this, the first conductive line and the second conductive line may be formed only in one-axis direction without a bending structure, or may be formed as a bending structure.

In relation to this, the first conductive line 1201*b* may include a first coupling line 1201*b*-1 and a second extended line 1201*b*-2. Also, the second conductive line 1202*b* may include a second coupling line 1202*b*-1 and a second extended line 1202*b*-2.

The first coupling line 1201*b*-1 may be formed perpendicular to the feeding part 1211*b*, and may be coupled to the second conductive line 1202*b*, spaced a predetermined distance apart from it. Specifically, the first coupling line 1201*b*-1 may be coupled to the second coupling line 1202*b*-1, spaced a predetermined distance apart from it. The first extended line 1201*b*-2 may be formed perpendicular to the first coupling line 1201*b*-1, with some region being coupled to the second conductive line 1202*b*. Specifically, part of the length of the first extended line 1201*b*-2 may be coupled to the second extended line 1202*b*-2, spaced a predetermined distance apart from it. In relation to this, the length of the first conductive line 1201*b* may be larger than the length of the second conductive line 1202*b*.

The second coupling line 1202*b*-1 may be formed perpendicular to the ground connection part 1212*b*, and may be coupled to the first conductive line 1201*b*, spaced a predetermined distance apart from it. Specifically, the second coupling line 1202*b*-1 may be coupled to the first coupling line 1201*b*-1, spaced a predetermined distance apart from it. The second extended line 1202*b*-2 may be formed perpendicular to the second coupling line 1202*b*-1, and may be coupled to the first conductive line 1201*b*. Specifically, the second extended line 1202*b*-2 may be coupled to the first extended line 1201*b*-2 of the first conductive line 1201*b*, spaced a predetermined distance apart from it. In relation to this, the length of the second conductive line 1202*b* may be smaller than the length of the first conductive line 1201*b*.

Figure 13A:
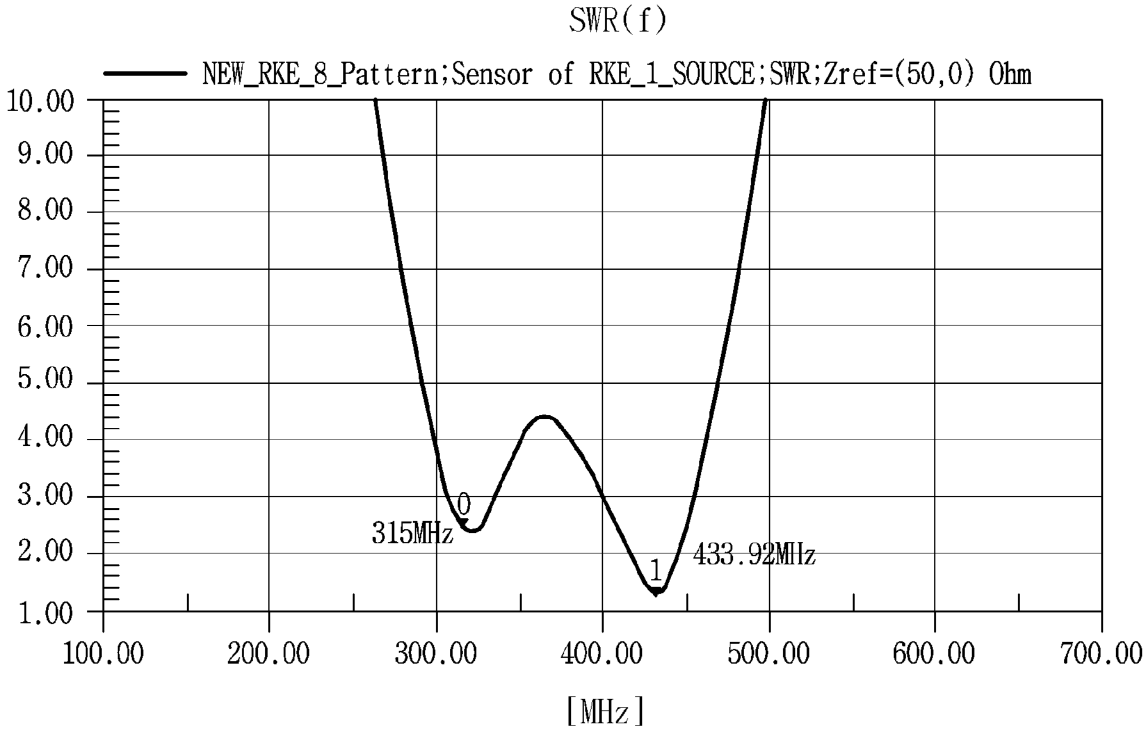
FIGS. 13A and 13B illustrate antenna reflection coefficient characteristics and efficiency characteristics achieved through ground optimization in an RKE antenna configuration in the form of a conductive line according to an embodiment.
Figure 13B:
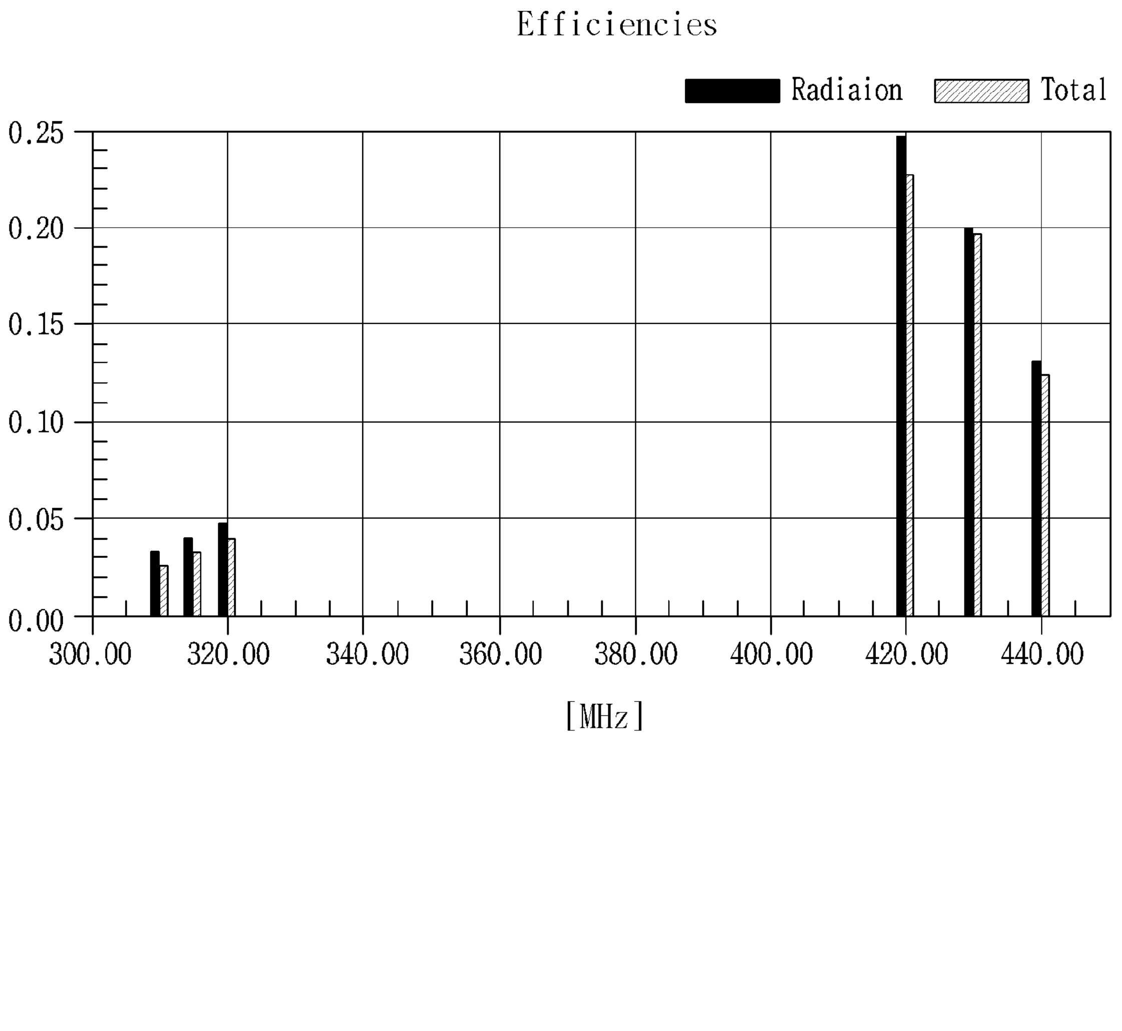

As described above, in an antenna of type 2 configured as a conductive line on one side and the other side of the main board of the antenna system, the ground of the main board and the ground of a side PCB may be connected, and the ground pattern of the antenna substrate may be changed. In such a type 2 antenna configuration, the antenna reflection coefficient characteristics and efficiency characteristics shown in FIGS. 13A and 13B may be obtained by changing the ground structure. That is, FIGS. 13A and 13B illustrate antenna reflection coefficient characteristics and efficiency characteristics achieved through ground optimization in an RKE antenna configuration in the form of a conductive line according to an embodiment.

Referring to FIGS. 11A to 12B and FIG. 13A, the first and second RKE antennas 1210 and 1220 formed from conductive lines spaced a predetermined distance apart from each other may be configured to resonate in a dual mode at 315 MHz and 433 MHz. Referring to FIGS. 11A to 12B and FIG. 13B, it can be seen that the antenna efficiency is higher at 433 MHz which is in the third RKE band than in the first RKE band. In relation to this, radiation occurs primarily by the first conductive line 1201*b* corresponding to the main radiator, at 433 MHZ which is in the third RKE band.

Figure 14A:
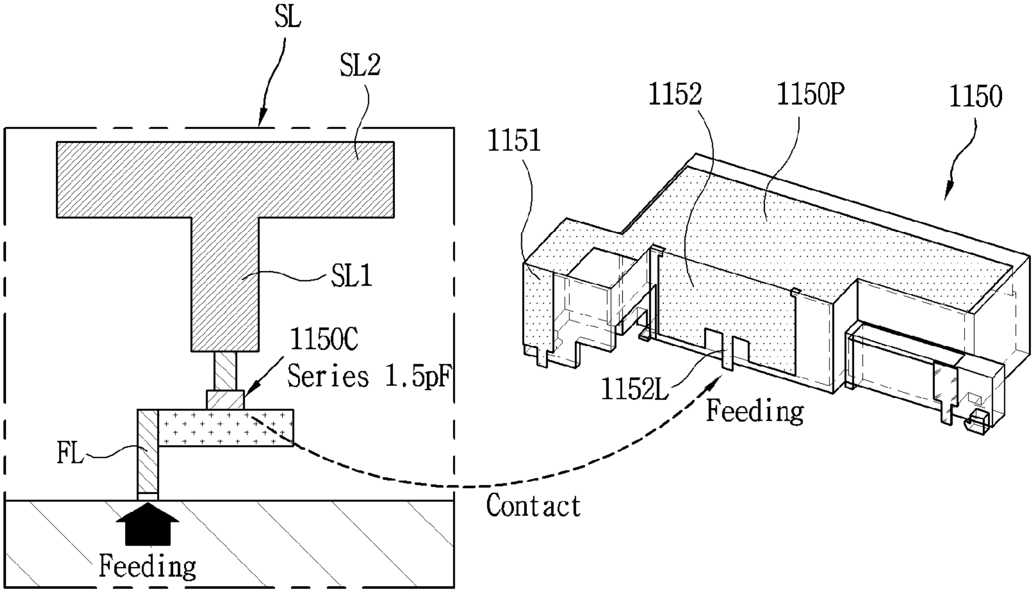
FIG. 14A illustrates a 5G antenna formed as a dielectric antenna and a configuration of a trip line and matching circuit connected to the same, according to an embodiment.
Figure 14B:
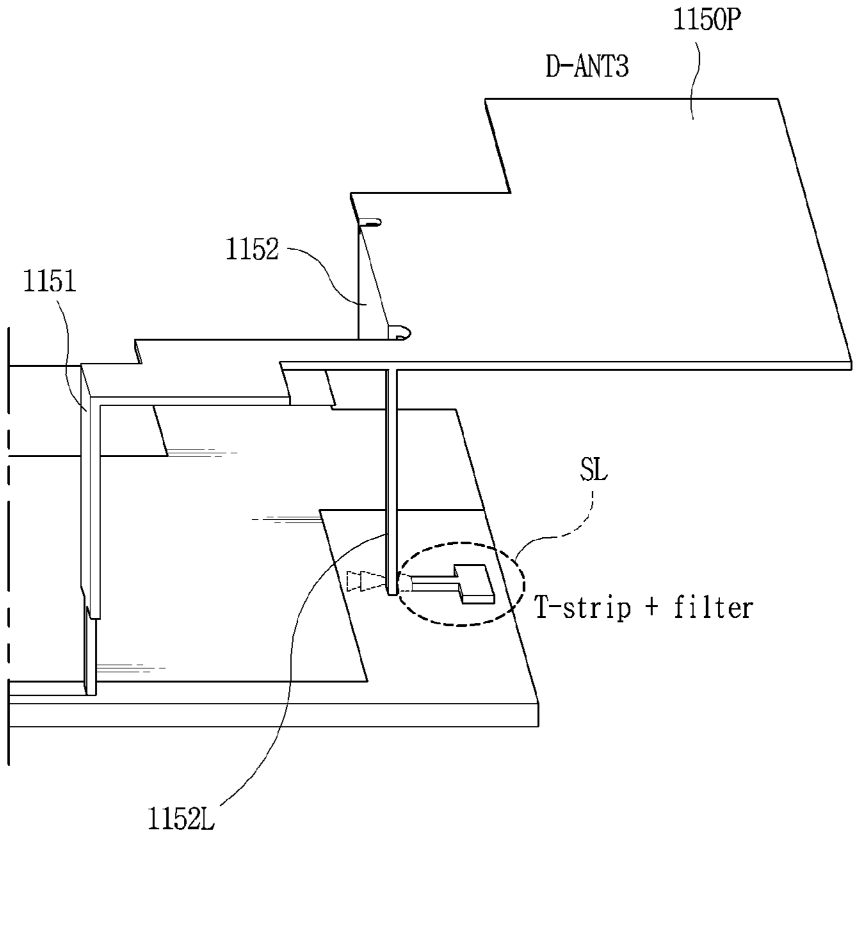
FIG. 14B illustrates a metal pattern of a 5G antenna and a configuration of a strip line and a matching circuit.
Figure 14C:
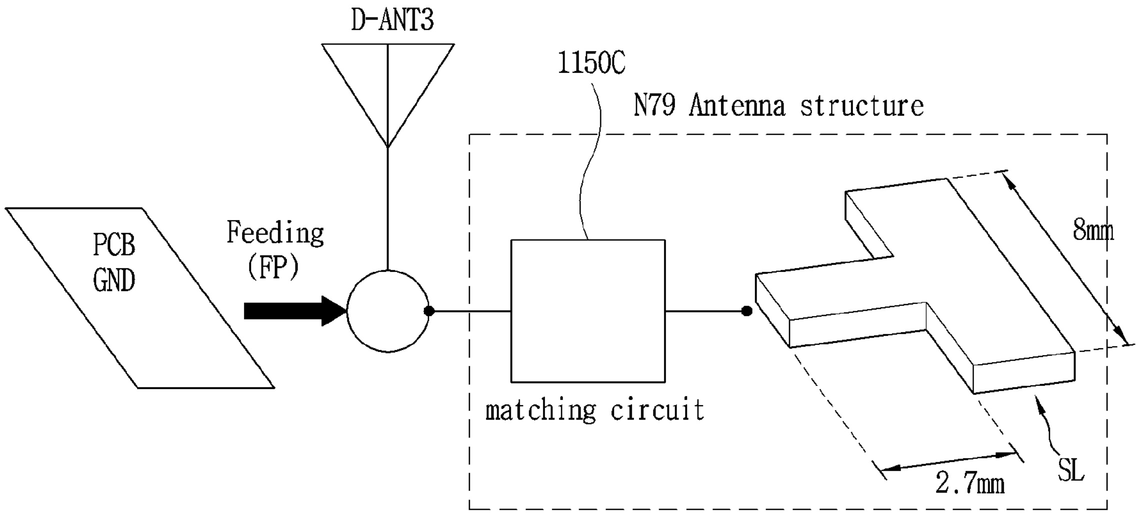
FIG. 14C is a conceptual diagram of a connection structure of a ground, a 5G antenna, a matching circuit, and a T-strip.

Meanwhile, in a 5G antenna or RKE antenna according to the present disclosure, antenna performance may be optimized in an operating band through a strip line or a matching circuit. In relation to this, referring to FIGS. 5A to 7C and FIG. 14A, the 5G antenna may be provided as a dielectric antenna, and the dielectric antenna may be configured to be electrically connected to the strip line through the matching circuit. Thus, FIG. 14A illustrates a 5G antenna formed as a dielectric antenna and a configuration of a trip line and matching circuit connected to the same, according to an embodiment. Meanwhile, FIG. 14B illustrates a metal pattern of a 5G antenna and a configuration of a strip line and a matching circuit. In relation to this, FIG. 14C is a conceptual diagram of a connection structure of a ground, a 5G antenna, a matching circuit, and a T-strip.

Referring to FIGS. 5A to 7C and FIGS. 14A to 14C, the antenna system may include a feeding part FP, a strip line SL, and a dielectric antenna 1150. Here, the strip line SL may refer to a T-shaped microstrip line.

The feeding part FP may be formed on the main board of the antenna system. The strip line SL may be electrically connected to one side of the feeding part FP, and may be formed in a first-axis direction and a second-axis direction perpendicular to the first-axis direction. That is, the strip line SL may include a first strip line SL1 formed in the first-axis direction and a second strip line SL2 formed in the second-axis direction perpendicular to the first-axis direction.

The dielectric antenna 1150 may be formed by a metal pattern on a dielectric structure disposed on the main board. In relation to this, a first metal pattern 1151 and a second metal pattern 1152 formed on the side of the dielectric antenna 1150 may be electrically connected to grounds in the vicinity of the feeding part FP and the strip line SL, respectively.

Referring to FIGS. 5A to 7C and FIGS. 14A to 14C, the antenna system 1000 may include an RKE antenna 1200*a* and 1200*b* including a main radiator 1201*a* and 1201*b* and a parasitic radiator 1202*a* and 1202*b*. The main radiator 1201*a* and 1201*b* may be referred to as Branch 1, and the parasitic radiator 1202*a* and 1202*b* may be referred to as Branch 2. It may be assumed that Branch 1 corresponding to the main radiator 1201*a* and 1201*b* operates in a first mode. Also, it may be assumed that Branch 2 corresponding to the parasitic radiator 1202*a* and 1202*b* operates in a second mode. Accordingly, the RKE antenna 1200 operating in multiple modes, i.e., the first and second modes, may be configured to resonate in a dual mode over a wide range.

The main radiator 1201*a* and 1201*b* may be formed on the antenna board PCB and configured to be electrically connected to the feeding part 1211*a* and 1211*b*. The parasitic radiator 1202*a* and 1202*b* may be formed to be spaced a predetermined distance apart from the main radiator 1201*a* and 1201*b* so that a signal from the main radiator 1201*a* and 1201*b* is gap-coupled. The parasitic radiator 1202*a* and 1202*b* may be electrically connected to a ground through a ground connection part 1212*a* and 1212*b*. Meanwhile, the main radiator 1201*a* and 1201*b* may operate in the first mode, and the parasitic radiator 1202*a* and 1202*b* may operate in the second mode. Accordingly, the RKE antenna 1200*a* and 1200*b* operating in multiple modes, i.e., the first and second modes, may be configured to resonate in a dual mode over a wide range.

The antenna system 1000 may include an RKE antenna 1200 including the above-described main radiator 1201*a* and 1201*b* and the above-described parasitic radiator 1202*a* and 1202*b*, the strip line SL, and the dielectric antenna 1150. Thus, the antenna system 1000 may receive or send a 5G signal while receiving or sending an RKE signal.

The strip line SL may be electrically connected to one side of the feeding part FP formed on the main board of the antenna system. Also, the strip line SL may be formed in a first-axis direction and a second-axis direction perpendicular to the first axis direction. That is, the strip line SL may include a first strip line SL1 formed in the first-axis direction and a second strip line SL2 formed in the second-axis direction perpendicular to the first-axis direction.

The dielectric antenna 1150 may be formed by a metal pattern on a dielectric structure disposed on the main board. In relation to this, a first metal pattern 1151 and a second metal pattern 1152 formed on the side of the dielectric antenna 1150 may be electrically connected to grounds in the vicinity of the feeding part FP and the strip line SL, respectively.

The dielectric antenna 1150 may include a front metal pattern 1150P and a first metal pattern 1151 and a second metal pattern 1152 which correspond to a side metal pattern. The front metal pattern 1150P may be formed on the front of the dielectric structure. The first metal pattern 1151 may be formed on a first side protruding from the dielectric structure. The second metal pattern 1152 may be formed on a second side of the dielectric structure.

As described above, the strip line SL may be formed in the first-axis direction and the second-axis direction perpendicular to the first-axis direction. The strip line SL may include a first strip line SL1 of a predetermined width and a predetermined length formed in the first-axis direction. The strip line SL may further include a second strip line SL2 formed to extend a predetermined length in the second-axis direction corresponding to two opposite sides from an end of the first strip line. For example, the length of the first strip line SL1 may be set to about 2.7 mm, and the length of the second strip line SL2 may be set to 8.0 mm, but they are not limited thereto. Meanwhile, the strip line SL including the first strip line SL1 and the second strip line SL2 may be designed with a dimension of 8.0 mm×4.5 mm, but is not limited thereto. In relation to this, antennas may have resonance characteristics near a 5G n79 band by a feeding part, a filter, and a T-strip line alone, even without a primary antenna (i.e., dielectric antenna).

Meanwhile, a T-strip line structure applied to the present disclosure is a structure suitable for simultaneous tuning of antenna resonance and impedance matching in a metal pattern implemented on a PCB. In relation to this, the length of the second strip line SL2 is a primary factor in determining the resonance frequency of an antenna. Meanwhile, the length of the first strip line SL1 is a primary factor affecting impedance matching. On the other hand, the width of the second strip line SL2 is a primary factor for finely tuning impedance matching.

The second metal pattern 1152 that can be connected to the feeding part FP may be configured to be connected to the front metal pattern 1150P. The second metal pattern 1152 may be formed in the form of a rectangular patch of a predetermined width and a predetermined length. An end of the rectangular patch connected to an end of the first strip line SL1, that is, the second metal pattern 1152, may be formed as a conductive line 1152L. Both sides of the conductive line 1152L may be formed as an inset structure which is formed by removing the metal pattern by a predetermined length and a predetermined width. Using the conductive line 1152L having such an inset structure, impedance matching characteristics may be improved without any additional conductive line such as an impedance converter connected with the feeding part FP. Thus, impedance matching characteristics may be improved by the conductive line 1152L having an inset structure, without increasing the height of a dielectric structure.

Figure 15B:
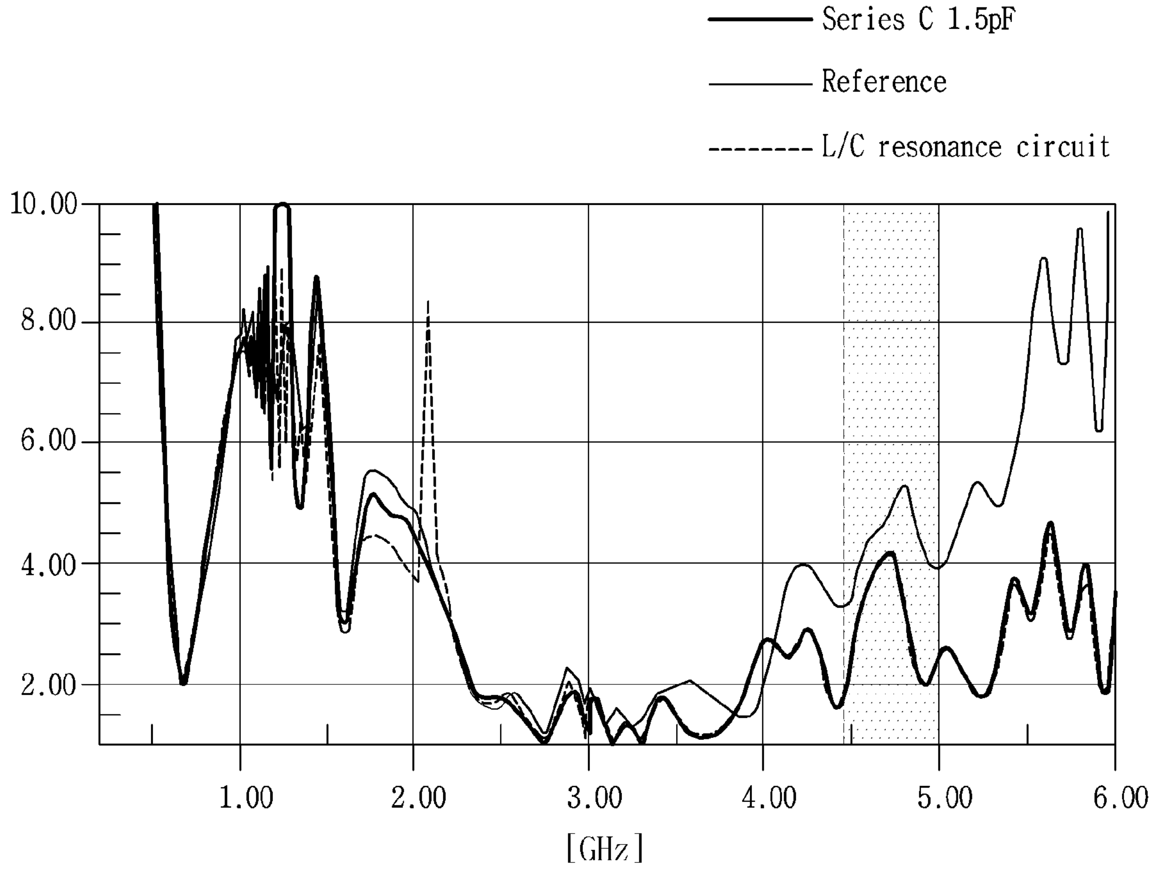
FIG. 15B illustrates VSWR characteristics of a 5G antenna depending on the presence or absence of a matching circuit and different matching circuit configurations.
Figure 15C:
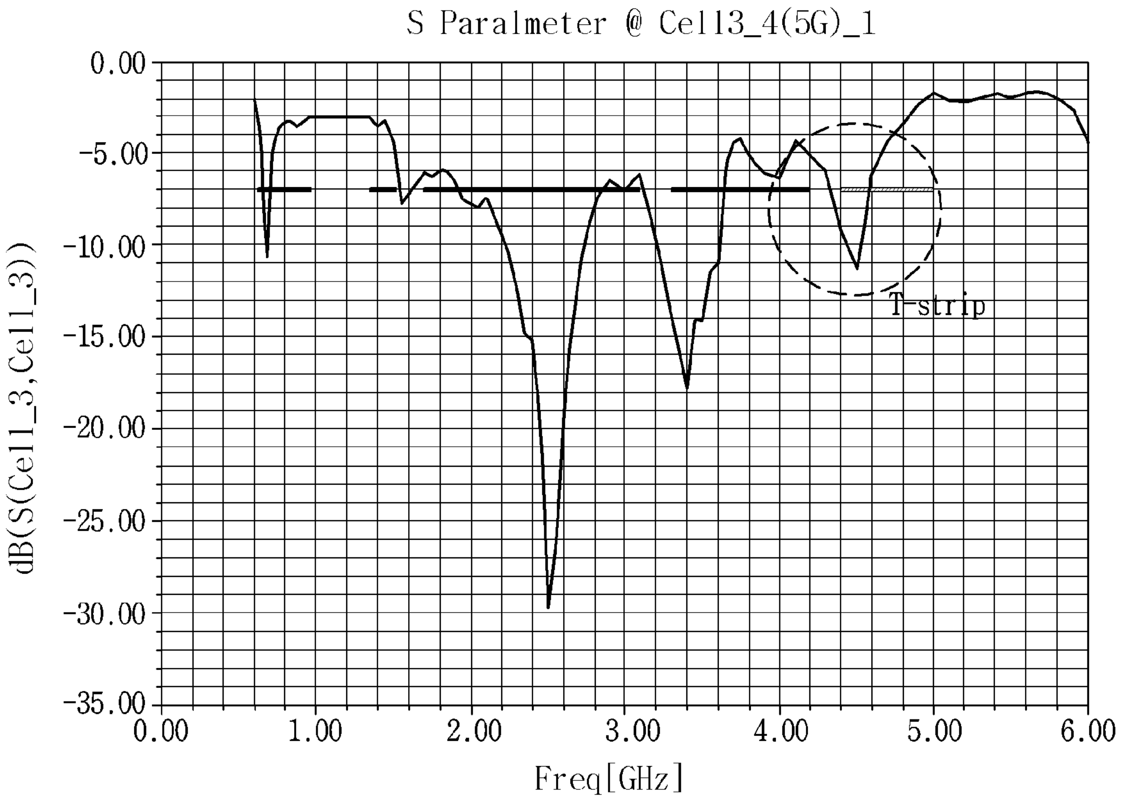
FIG. 15C illustrates reflection coefficient characteristics of a 5G antenna having a matching circuit configured as a capacitor and a T-strip line.

Meanwhile, the dielectric antenna 1150 may be configured to improve performance in a specific band out of 5G frequency bands. In relation to this, a conductive line 1152L corresponding to an end of the second metal pattern 1152 may be connected to an end of the first strip line SL1 through a matching circuit 1150C. In relation to this, FIG. 15A illustrates the inductance and capacitance of an impedance matching circuit of a plurality of antennas in an antenna system according to an embodiment. FIG. 15B illustrates VSWR characteristics of a 5G antenna depending on the presence or absence of a matching circuit and different matching circuit configurations. Meanwhile, FIG. 15C illustrates reflection coefficient characteristics of a 5G antenna having a matching circuit configured as a capacitor and a T-strip line.

Referring to FIGS. 14A to 14C and FIG. 15C, a dielectric antenna operating in a 5G band, for example, a third dielectric antenna D-ANT3, may have optimized performance by a T-strip line and a capacitor having a capacitance value in a predetermined range with respect to 1.5 pF. In relation to this, the bandwidth characteristics of a dielectric antenna connected to a T-strip-shaped strip line SL by using high-band pass characteristics of 1.5 pF.

Meanwhile, first and second antennas operating in a 5G band may have optimized performance by a serial inductor having an inductance value within a predetermined range with respect to 3 nH and a parallel capacitor having a capacitance value in a predetermined range with respect to 0.5 pF.

Referring to FIGS. 14A to 14C and FIGS. 15A to 15C, the dielectric antenna 1150 may operate as an antenna in 5G L/M/H bands. In relation to this, the dielectric antenna 1150 may be operated to resonate additionally in a 5G n79 band by the matching circuit 1150C and a stub line SL. Thus, the dielectric antenna 1150 may be operated to resonate additionally in a frequency band of 4.2 GHz to 4.8 GHz by the matching circuit 1150C and the stub line SL. To this end, the stub line SL corresponding a filter may be electrically connected to the feeding part FP. Also, the stub line SL corresponding to a T-strip and the matching circuit 1150C corresponding to a filter may be electrically connected to a ground on the bottom end of the dielectric antenna 1150.

Referring to FIG. 15B, in a reference case where no matching circuit is provided, the VSWR characteristics are deteriorated in a 5G HB band. Meanwhile, in an UC resonance circuit case where a combination of an inductor and a capacitor is provided, the VSWR characteristics are good in the 5G HB band but the VSWR characteristics are deteriorated in an about 2.1 GHz band. For example, in a case where a resonance circuit for a 1.5 pF capacitor and a 1.5 nH inductor is provided, the VSWR characteristics in the 5G HB band are improved. However, in the case where a resonance circuit for a 1.5 pF capacitor and a 1.5 nH inductor is provided, the VSWR characteristics are deteriorated in an about 2.1 GHz band. Such unwanted characteristics of an antenna occur due to the addition of a resonance circuit or by an interaction with a peripheral PCB or mechanism when coupled to the resonance circuit. Accordingly, there is a need to eliminate a singular point in the about 2.1 GHz band by changing the configuration of the resonance circuit including an inductor and a capacitor. To this end, it is necessary to change the resonance circuit into a band-pass filter or a high-pass filter. Alternatively, the resonance circuit may be changed into a band stop filter in order to minimize characteristic changes of a primary antenna (i.e., dielectric antenna) near a resonance frequency of a T-strip. Accordingly, a singular point at which the VSWR characteristics are deteriorated at a specific frequency may be moved out of a desired frequency band.

To solve the aforementioned problem, the singular point in the about 2.1 GHz band may be eliminated by configuring the resonance circuit by a 1.5 pF capacitor. Thus, the deterioration of the VSWR characteristics at the about 2.1 GHz band may be solved by configuring the resonance circuit by a 1.5 pF capacitor.

Referring to FIG. 15C, the dielectric antenna may be operated to resonate additionally in a frequency band of 4.2 GHz to 4.8 GHz, that is, a 5G n79 band, by the matching circuit 1150C and the stub line SL.

Figure 16:
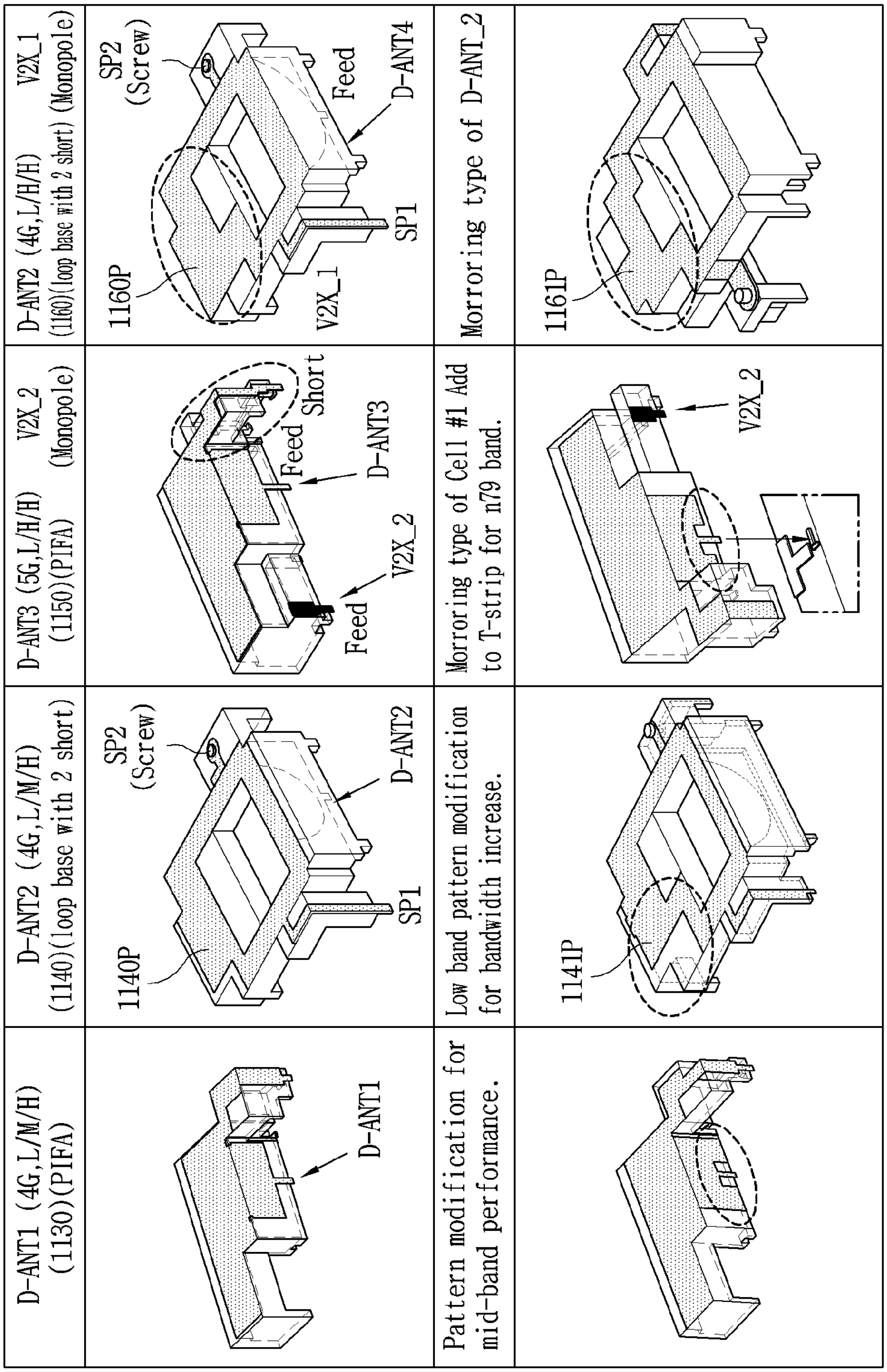
FIG. 16 illustrates the shape of a dielectric antenna that can be disposed on the main board of an antenna system according to various embodiments.

Meanwhile, a dielectric antenna 1150 disclosed in the present disclosure may be disposed at different positions on the antenna system 1000 in the form of various metal patterns. In relation to this, FIG. 16 illustrates the shape of a dielectric antenna that can be disposed on the main board of an antenna system according to various embodiments.

Referring to FIGS. 5A to 7C, FIGS. 14A to 14C, and FIG. 16, the dielectric antenna 1150 may be a first dielectric antenna (D-ANT1) 1130 placed adjacent to a first antenna (ANT1) 1110. In relation to this, the first antenna (ANT1) 1110 may be formed on one side separated from the main board and operate in a 5G frequency band. The first dielectric antenna (D-ANT1) 1130 may operate as a PIFA (planar inverted F) antenna by a metal pattern formed on the front and side of the dielectric structure. The first dielectric antenna D-ANT1 may operate in a 4G low band (LB), a mid band (MB), and a high band (HB). The first metal pattern 1151 and second metal pattern 1152 formed on the side of the first dielectric antenna D-ANT1 may be electrically connected to a feeding part and a ground, respectively. Meanwhile, the metal pattern of the first dielectric antenna (D-ANT1) 1130 may be partially altered to improve the antenna performance in the mid band (MB). For example, the first metal pattern 1151 of the first dielectric antenna D-ANT1 may be changed to improve the antenna performance in the mid band (MB).

The dielectric antenna 1150 may be placed adjacent to the first dielectric antenna (D-ANT1) 1130, and may further include a second dielectric antenna (D-ANT2) 1140 with a loop-shaped front metal pattern formed on the front of a dielectric structure. The second dielectric antenna (D-ANT2) 1140 also may be configured to operate in 4G L/M/H bands. In the second dielectric antenna (D-ANT2) 1140, a feeding part FP2 electrically connected to one side of the front metal pattern may be formed on a side inside the dielectric structure.

Meanwhile, two opposite sides of the front metal pattern may be electrically connected to a ground through shorted parts SP1 and SP2. In relation to this, the first shorted part SP1 may be formed along the side of the dielectric structure, and the second shorted part SP2 may be formed only on the front of the dielectric structure and connected to the ground through a separate screw. Since the first shorted part SP1 and the second shorted part SP2 are configured differently, the antenna bandwidth characteristics may be further improved compared to when they are configured in the same shape. Meanwhile, two opposite sides of the front metal pattern may be connected to the ground but with no feeding part.

For a bandwidth increase in a low band, the front metal pattern of the second dielectric antenna (D-ANT2) 1140 may be partially altered. For example, the front metal pattern 1140P of the second dielectric antenna (D-ANT2) 1140 may be configured as an altered metal pattern 1141P so that one side region of the metal pattern is partially removed.

The dielectric antenna 1150 may be a third dielectric antenna (D-ANT3) 1150 placed adjacent to a second antenna (ANT2) 1120. In relation to this, the second antenna (ANT2) 1120 may be formed on the other side separated from the main board, and operate in a 5G frequency band. The third dielectric antenna (D-ANT3) 1150 may operate as a PIFA (planar inverted F) antenna by a metal pattern formed on the front and side of the dielectric structure. The third dielectric antenna (D-ANT3) 1150 may be configured to operate in 5G L/M/H bands. Meanwhile, a V2X feeding part V2X_FP for feeding a V2X antenna may be formed on the side of the dielectric structure where the first metal pattern 1151 and the second metal pattern 1151 are not formed.

The dielectric antenna 1150 may be placed adjacent to the third dielectric antenna (D-ANT3) 1150, and may further include a second dielectric antenna (D-ANT4) 1160 with a loop-shaped front metal pattern formed on the front of a dielectric structure. In the fourth dielectric antenna (D-ANT4) 1160, a feeding part FP4 electrically connected to one side of the front metal pattern may be formed on a side inside the dielectric structure. The fourth dielectric antenna (D-ANT4) 1160 also may be configured to operate in 5G L/M/H bands.

The front metal pattern 1160P of the fourth dielectric antenna (D-ANT4) 1160 may be configured as an altered metal pattern so that one side region is partially removed. Meanwhile, the front metal pattern 1161P may be configured as an altered metal pattern so that one side region and the other side region are partially removed, in order to further improve the bandwidth characteristics. Two opposite sides of the front metal pattern 1160P and 1161P may be electrically connected to a ground. Two opposite sides of the front metal pattern 1160P and 1161P may be configured to have no feeding part.

Figure 17:
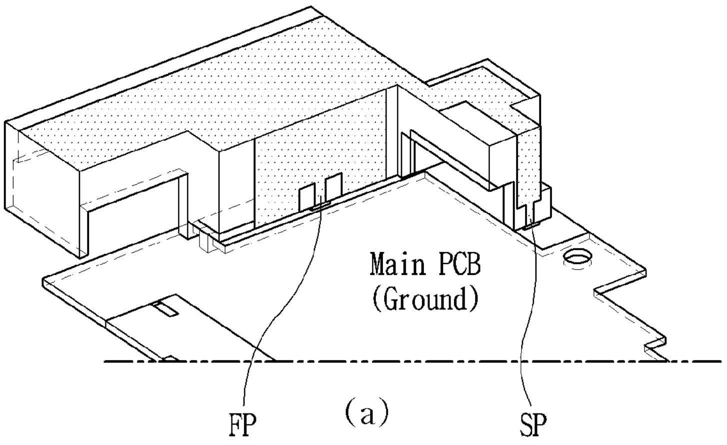
FIG. 17 illustrates a perspective view and side view of a PIFA antenna and a connection structure with a heat sink, according to an embodiment.
Figure 17:
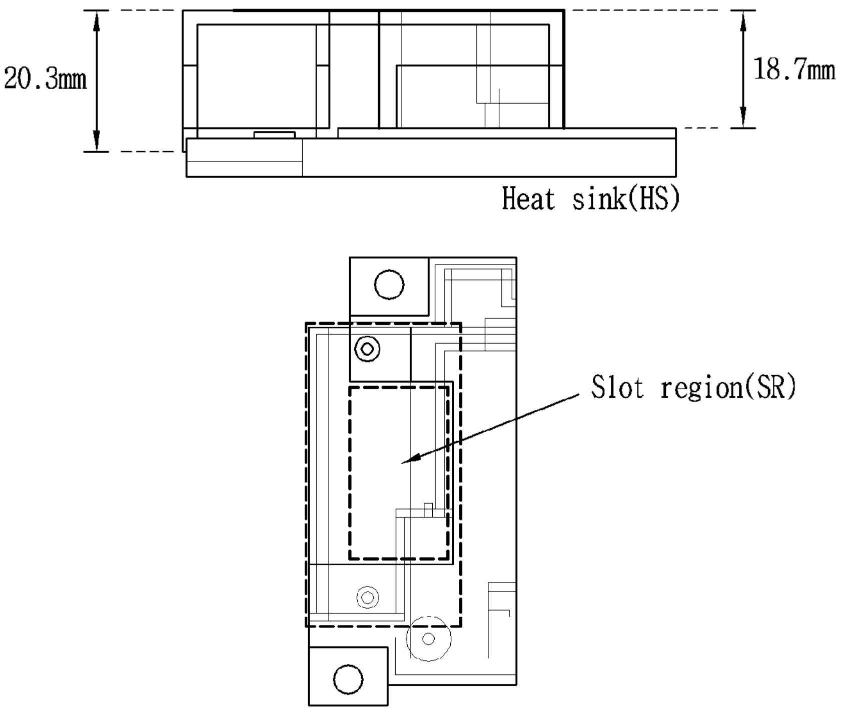
Figure 18:
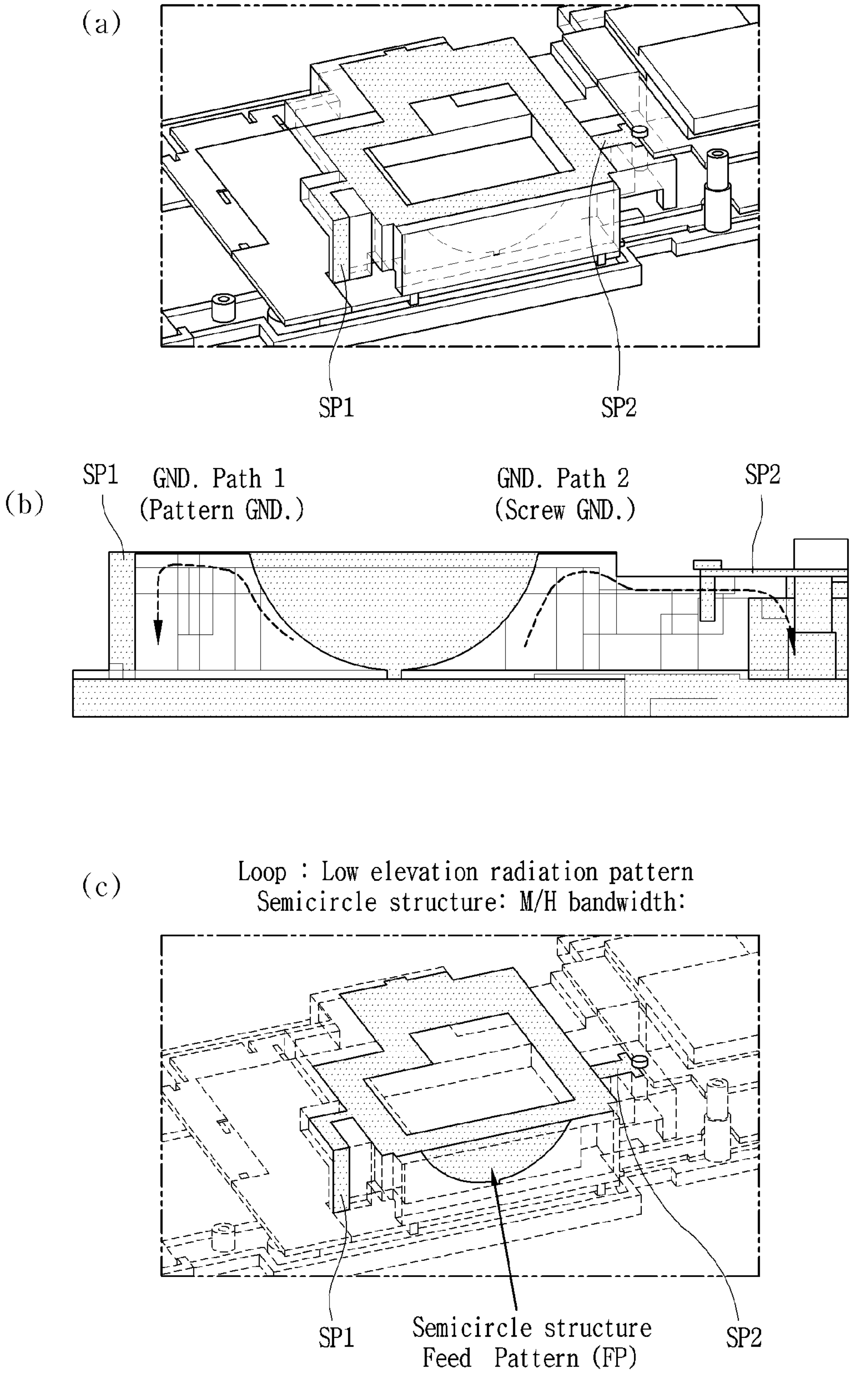
FIG. 18 illustrates a perspective view and side view of a loop antenna and a connection structure with a heat sink, according to an embodiment.

A plurality of dielectric antennas disclosed in the present disclosure may be implemented on a dielectric structure as PIFA antennas or loop-shaped antennas. In relation to this, FIG. 17 illustrates a perspective view and side view of a PIFA antenna and a connection structure with a heat sink, according to an embodiment. FIG. 18 illustrates a perspective view and side view of a loop antenna and a connection structure with a heat sink, according to an embodiment.

Referring to (a) of FIG. 17, a feeding part FP and shorted part SP of a dielectric antenna having the shape of a PIFA antenna are electrically connected to a feeding part and ground of the main board. The dielectric antenna having the shape of a PIFA antenna may be formed as an open ground structure in which the rest of a dielectric region except where the shorted part SP is formed is not connected to the ground.

Referring to (b) of FIG. 17, the dielectric antenna may be configured to make contact with a heat sink HS, so as to release heat generated inside the antenna system and heat introduced from the outside. Meanwhile, in order to maintain or improve the performance of the dielectric antenna which is formed as an open ground structure, a slot region SR from which metal is removed may be formed on the heat sink HS.

Referring to (a) of FIG. 18, the first shorted part SP1 and second shorted part SP2 of a loop antenna-shaped dielectric antenna may be electrically connected to grounds on different substrates. In relation to this, referring to (b) of FIG. 18, different ground paths are formed by the first shorted part SP1 and second shorted part SP2 of the antenna, thereby improving the antenna characteristics in a low band LB.

Meanwhile, referring to (c) of FIG. 18, in the dielectric antenna, a feeding part FP electrically connected to one side of the front metal pattern may be formed on a side inside the dielectric structure. For example, the feeding part FP may be formed in a semi-circle shape and improve the antenna characteristics in a mid band MB and a high band HB. The feeding part FP having a semi-circle shape may operate like an impedance converter, compared to a conductive line-shaped feeding part. Thus, the feeding part FP having a semi-circle shape allows the dielectric antenna to operate over a wide range in a mid band MB and a high band HB, compared to the feeding part having the shape of a conductive line.

Meanwhile, the loop-shaped antenna structure has low-elevation radiation characteristics compared to a PIFA-shaped antenna structure. Thus, referring to FIGS. 5A to 7C, FIGS. 14A to 14C, and FIGS. 16 to 18, the loop-shaped dielectric antenna has low-elevation radiation characteristics. In other words, the second and fourth dielectric antennas D-ANT2 and D-ANT4 operating as loop antennas have low-elevation radiation characteristics compared to the first and third dielectric antennas D-ANT1 and D-ANT3 operating as PIFA antennas.

Various changes and modifications to the above-described embodiments related to an antenna system and a plurality of antennas will be clearly understood by a person skilled in the art without departing from the spirit and scope of the present disclosure. Accordingly, various changes and modifications to the embodiments are to be understood as falling within the scope of the following claims.

Figure 19:
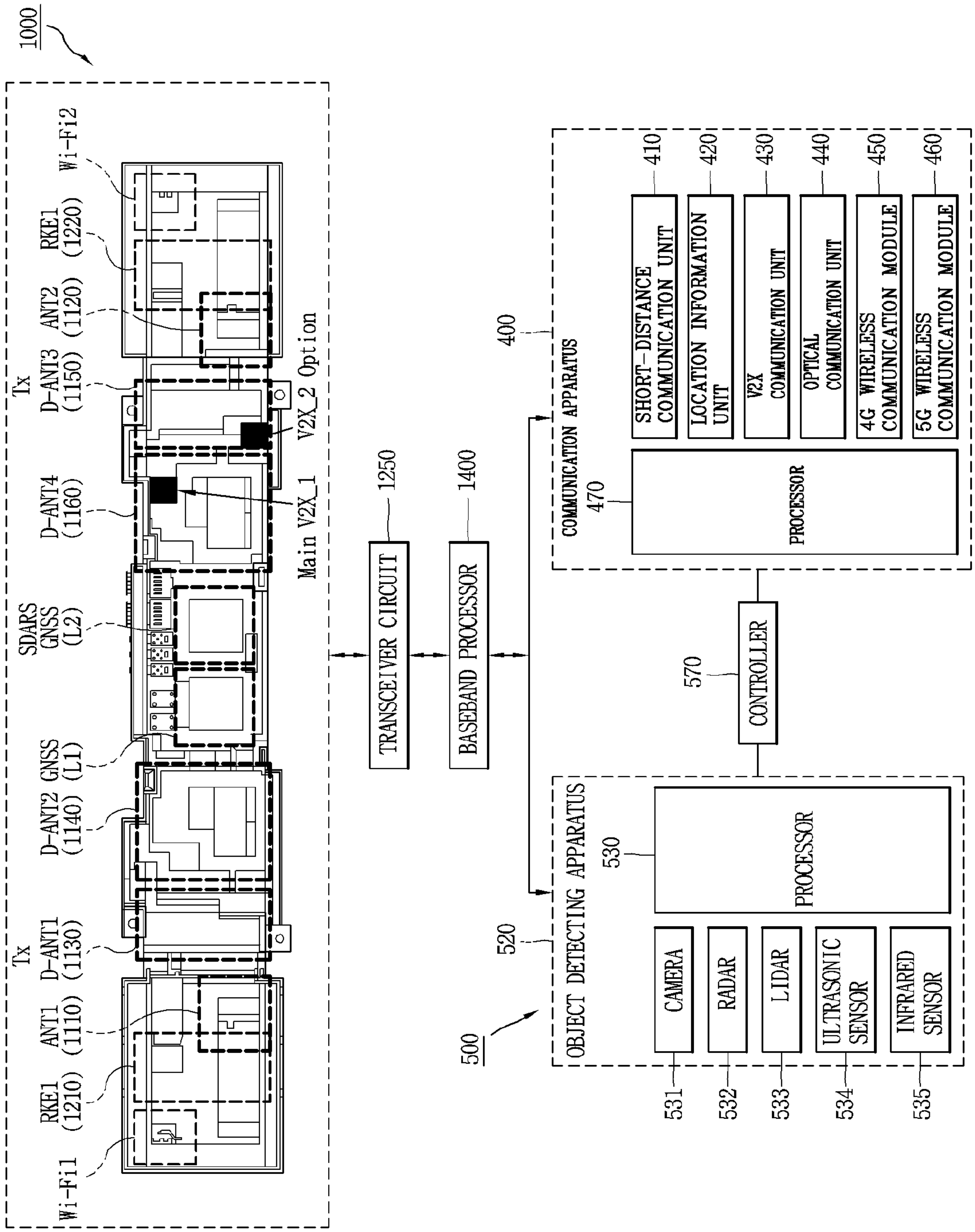
FIG. 19 illustrates a configuration of a vehicle having an antenna system according to an embodiment.

According to an embodiment, multiple input/multiple output (MIMO) may be performed using a plurality of antennas in the antenna system 1000. In relation to this, FIG. 19 illustrates a configuration of a vehicle having an antenna system according to an embodiment. Referring to FIG. 19, the antenna system 1000 may be configured to include a transceiver circuit 1250 and a baseband processor 1400, as described above. For example, the baseband processor 1400 may perform 2×2 MIMO or 4×4 MIMO using some of the plurality of antennas 1100.

In this regard, the baseband processor 1400 may control the transceiver circuit 1250 to perform 2×2 MIMO through two or more of the plurality of antenna elements 1110 to 1160. Meanwhile, the baseband processor 1400 may control the transceiver circuit 1250 to perform 4×4 MIMO through four or more of the plurality of antenna elements 1110 to 1160.

The first and second RKE antennas 1210 and 1220 may be configured from a main radiator and a parasitic radiator which have a gap-coupling structure. The first and second RKE antennas 1210 and 1220 may be formed in the form of coupled rectangular patches or coupled conductive lines.

Meanwhile, the first and second antennas ANT1 and ANT2 each may operate in a 5G band. In relation to this, the first and second antennas ANT1 and ANT2 may be configured from a main radiator and a parasitic radiator which are formed perpendicular to an antenna substrate. Also, the first to fourth dielectric antennas D-ANT1 to D-ANT4 may operate in 4G/5G bands. In relation to this, the first to fourth dielectric antennas D-ANT1 to D-ANT4 may be dielectric antennas with a PIFA-shaped or loop-shaped metal pattern printed on them. A plurality of antennas ANT1, ANT2, and D-ANT1 to D-ANT4 operating in 4G/5G bands may support MIMO operation.

Therefore, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

As described above, the plurality of antenna elements 1110 to 1160 implemented on the dielectric carrier may operate in the full band including the low band LB, the middle band MB, and the high band HB. Here, the low band LB may be referred to as the first frequency band and the middle band MB and the high band HB may be referred to as the second frequency band. Accordingly, the baseband processor 1400 can perform MIMO through some of the plurality of antenna elements 1110 to 1160 in the first frequency band. Also, the baseband processor 1400 can perform MIMO through some of the plurality of antenna elements 1110 to 1160 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuit 1250 to receive the second signal of the second frequency band while receiving the first signal of the first frequency band through one of the plurality of antenna elements 1110 to 1160. In this case, the baseband processor 1400 can advantageously perform carrier aggregation (CA) through one antenna.

Alternatively, the baseband processor 1400 may control the transceiver circuit 1250 so as to receive a second signal in the same band through one of the fourth to sixth antennas 1140 to 1160 while receiving a first signal through one of the first to third antennas 1110 to 1130. In this case, adjacent antennas may be configured to operate in different bands, and antennas disposed in different regions may operate in the same band, thereby improving isolation between them.

The baseband processor 1400 may perform carrier aggregation (CA) through a combination of a first frequency band and a second frequency band. Accordingly, in the present disclosure, when it is necessary to receive a large amount of data for autonomous driving, there is an advantage that broadband reception is possible through carrier aggregation.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

It will be clearly understood by those skilled in the art that various changes and modifications to the aforementioned implementations related to the antenna system having the plurality of antennas, the vehicle having the antenna system, and the control operations thereof are made without departing from the idea and scope of the present disclosure. Therefore, it should be understood that such various changes and modifications to the implementations fall within the scope of the appended claims.

In the above, the antenna system mounted in the vehicle and the vehicle equipped with the antenna system have been described. Hereinafter, a description will be given of an antenna system mounted on a vehicle, a vehicle having the antenna system, and a wireless communication system including a base station. In this regard, FIG. 20 illustrates a block diagram of a wireless communication system that is applicable to methods proposed herein.

Figure 20:
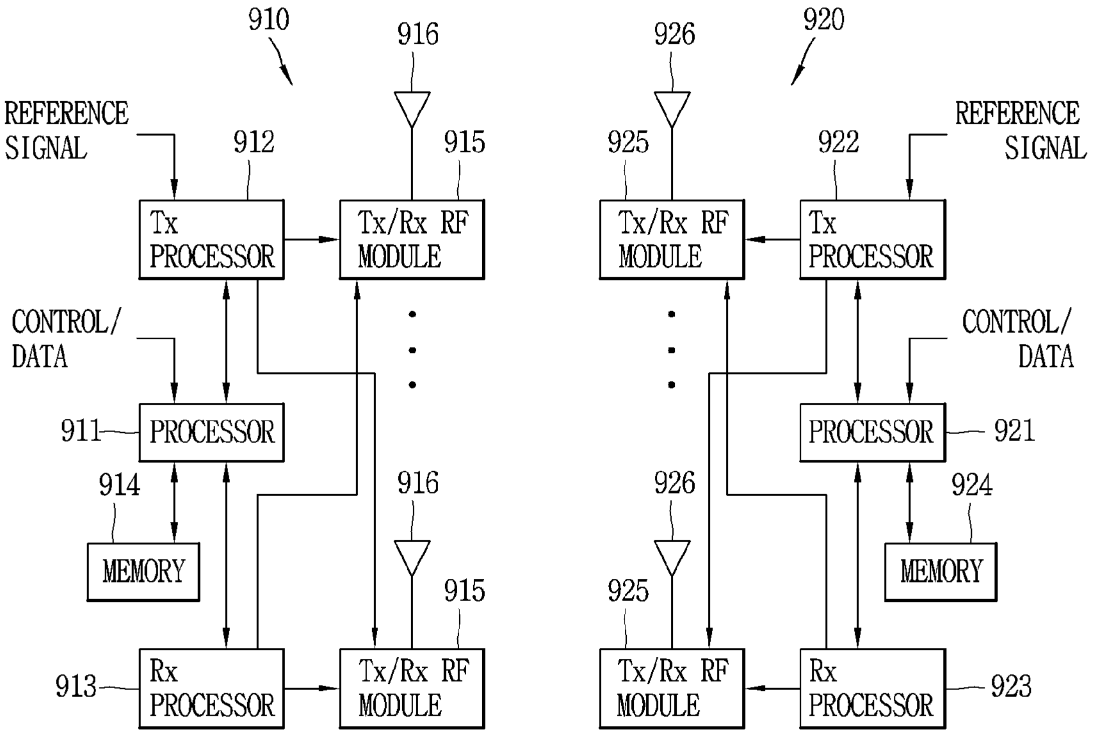
FIG. 20 is an exemplary block diagram of a wireless communication system to which methods proposed herein are applicable.

Referring to FIG. 20, the wireless communication system may include a first communication device 910 and/or a second communication device 920. The term 'A and/or B' may be interpreted as having the same meaning as 'including at least one of A or B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper layer packet from a core network may be provided to the processor 911. The processor may implement the function of an L2 layer. In DL, the processor may provide multiplexing between a logical channel and a transport channel and radio resource allocation to the second communication device 920, and may be responsible for signaling to the second communication device. The Tx processor 912 may implement various signal processing functions for an L1 layer (i.e., a physical layer). The signal processing function may facilitate forward error correction (FEC) in the second communication device, and include coding and interleaving. Encoded and modulated symbols may be divided into parallel streams. Each stream may be mapped to an OFDM subcarrier, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. Each spatial stream may be provided to the different antenna 916 via the separate Tx/Rx module (or transceiver) 915. Each Tx/Rx module may modulate an RF carrier into a spatial stream for transmission. The second communication device may receive a signal through the antenna 926 of each Tx/Rx module (or transceiver) 925. Each Tx/Rx module may recover information modulated to the RF carrier, and provide it to the RX processor 923. The RX processor may implement various signal processing functions of the layer 1. The RX processor may perform spatial processing with respect to information to recover an arbitrary spatial stream destined for the second communication device. If multiple spatial streams are destined for the second communication device, they may be combined into a single OFDMA symbol stream by plural RX processors. The RX processor may transform the OFDMA symbol stream from a time domain to a frequency domain by using Fast Fourier Transform (FFT). A frequency domain signal may include an individual OFDMA symbol stream for each subcarrier of the OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted by the first communication device on the physical channel. The corresponding data and control signal may then be provided to the processor 921.

UL (communication from the second communication device to the first communication device) may be processed in the first communication device 910 in a manner similar to that described with respect to the receiver function in the second communication device 920. Each Tx/Rx module 925 may receive a signal via the antenna 926. Each Tx/Rx module may provide the RF carrier and information to the RX processor 923. The processor 921 may be associated with the memory 924 that stores program code and data. The memory may be referred to as a computer-readable medium.

Meanwhile, when the first communication device is the vehicle, the second communication device may not be limited to the base station. In this regard, referring to FIG. 2A, the second communication device may be another vehicle, and V2V communication may be performed between the first communication device and the second communication device. On the other hand, the second communication device may be a pedestrian, and V2P communication may be performed between the first communication device and the second communication device. Also, the second communication device may be an RSU, and V2I communication may be performed between the first communication device and the second communication device. In addition, the second communication device may be an application server, and V2N communication may be performed between the first communication device and the second communication device.

In this regard, even when the second communication device is another vehicle, pedestrian, RSU, or application server, the base station may allocate resources for communication between the first communication device and the second communication device. Accordingly, a communication device configured to allocate resources for communication between the first communication device and the second communication device may be referred to as a third communication device. Meanwhile, the aforementioned series of communication procedures may also be performed among the first communication device to the third communication device.

In the above, the antenna system mounted in the vehicle and the vehicle equipped with the antenna system have been described. Hereinafter, technical effects of an antenna system mounted on a vehicle and a vehicle equipped with the antenna system will be described.

Hereinafter, technical effects of an antenna system mounted in a vehicle and a vehicle equipped with the antenna system will be described.

Hereinafter, technical effects of an antenna system mounted in a vehicle and a vehicle equipped with the antenna system will be described.

According to an implementation, antenna performance of an antenna system mounted in a vehicle can be improved while maintaining a height of the antenna system to be a predetermined level or lower.

According to an implementation, a structure for mounting an antenna system, which can operate in a broad frequency band, to a vehicle can be provided to support various communication systems by implementing a low band (LB) antenna and other antennas in one antenna module.

According to an implementation, a gap-coupled RKE (remote keyless entry) antenna operating in multiple bands and a matching circuit for the same may be provided.

According to an implementation, an antenna structure optimized for an antenna element to operate over a wide range including other bands than a low band (LB), an optimized matching circuit, and a stub pattern may be provided.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the foregoing description, an antenna system mounted in a vehicle and a control operation therefor may be implemented by software, firmware, or a combination thereof. Meanwhile, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna system mounted on a vehicle, the antenna system comprising:

a feeding part formed on a front surface of an antenna board;

a dielectric carrier disposed on a rear surface of the antenna board; and a radiator part formed on the dielectric carrier;

wherein the radiator part comprises:

a main radiator formed on a rear surface of the dielectric carrier and configured to be electrically connected to the feeding part; and a parasitic radiator formed on the rear surface of the dielectric carrier and formed to be spaced a predetermined distance apart from the main radiator so that a signal from the main radiator is gap-coupled, wherein the parasitic radiator is electrically connected to a ground of the antenna board through a ground connection part, the main radiator operates in a first mode, and the parasitic radiator can operate in a second mode.

2. The antenna system of claim 1, wherein the main radiator and the parasitic radiator are formed in the form of rectangular patches that are spaced a predetermined distance apart from each other, and operate as a first RKE (remote keyless entry) antenna, wherein the first RKE antenna is formed on a first antenna substrate separated from a main board of the antenna system and disposed on one side, and operate in a first RKE band and a second RKE band.

3. The antenna system of claim 2, wherein the main radiator includes a first patch connected to the feeding part and a second patch connected to the first patch, and the parasitic radiator includes a third patch connected to the ground connection part.

4. The antenna system of claim 3, wherein a first side of the third patch is spaced a predetermined distance apart from the first patch in a first direction, and a second side perpendicular to the first side of the third patch is spaced a predetermined distance apart from the second patch in a second direction.

5. The antenna system of claim 3, wherein the ground connection part includes:

a first connection part formed to be spaced a predetermined distance apart from the feeding part in the first direction; and a second connection part formed to be spaced a predetermined distance apart from the first patch in the second direction, wherein the second connection part is formed perpendicular to the first connection part.

6. The antenna system of claim 2, wherein the main radiator and the parasitic radiator are formed from conductive lines that are spaced a predetermined distance apart from each other, and operate as a second RKE antenna, wherein the second RKE antenna is formed on a second antenna board separated from a main board of the antenna system and disposed on one side, and operate in a second RKE band and a third RKE band.

7. The antenna system of claim 2, wherein the main radiator is formed from a first conductive line connected to the feeding part, and the parasitic radiator is formed from a second conductive line connected to the ground connection part, wherein the main radiator and the feeding part are connected to a serially-connected first inductor through a parallel-connected second inductor, and the parasitic radiator is connected to the ground through a serially-connected third inductor.

8. The antenna system of claim 7, wherein the first conductive line includes:

a first coupling line formed perpendicular to the feeding part, and coupled to the second conductive line, spaced a predetermined distance apart from the same; and a first extended line formed perpendicular to the first coupling line, with some region being coupled to the second conductive line, wherein the length of the first conductive line is larger than the length of the second conductive line.

9. The antenna system of claim 7, wherein the second conductive line includes:

a second coupling line formed perpendicular to the feeding part, and coupled to the first conductive line, spaced a predetermined distance apart from the same; and a first extended line formed perpendicular to the second coupling line, and coupled to the first extended line of the first conductive line, wherein the length of the second conductive line is smaller than the length of the first conductive line.

10. The antenna system of claim 7, further comprising:

a second dielectric structure disposed on a second antenna substrate, and formed in such a way that the height varies at a predetermined angle;

a third radiator formed on one side and the front of the second dielectric structure; and a fourth radiator connected perpendicular to the main board, and configured to be spaced a predetermined distance apart from the third radiator, the second antenna including the third radiator and the fourth radiator operate in a 5G frequency band.

11. The antenna system of claim 10, wherein a ground of the main board and a ground of a side PCB where the third radiator and the fourth radiator are formed are interconnected, and a ground pattern is removed from a region where the second RKE antenna is disposed.

12. The antenna system of claim 2, further comprising:

a first dielectric structure disposed on the antenna substrate, and formed in such a way that the height varies at a predetermined angle;

a first radiator formed on one side and the front of the first dielectric structure; and a second radiator connected perpendicular to the main board separated from the antenna board and disposed on one side, and configured to be spaced a predetermined distance apart from the first radiator formed on a front surface of the first dielectric structure, the first antenna including the first radiator and the second radiator operate in a 5G frequency band.

13. The antenna system of claim 12, wherein a ground of the main board and a ground of a side PCB where the first radiator and the second radiator are formed are interconnected, and a ground pattern is removed from a region where the main radiator of the first RKE antenna is disposed.

14. The antenna system of claim 1, comprising:

a first RKE antenna formed from a main radiator and a parasitic radiator which are in the form of rectangular patches on a first antenna substrate separated from a main board of the antenna system and disposed on one side; and a second RKE antenna formed from a main radiator and a parasitic radiator which are in the form of conductive lines on a second antenna substrate separated from the main board and disposed on the other side.

15. The antenna system of claim 1, comprising:

a first RKE antenna formed from a main radiator and a parasitic radiator which are in the form of conductive lines on a first antenna substrate separated from a main board of the antenna system and disposed on one side; and a second RKE antenna formed from a main radiator and a parasitic radiator which are in the form of conductive lines on a second antenna substrate separated from the main board and disposed on the other side.

16. The antenna system of claim 1, further comprising:

a feeding part formed on a main board of the antenna system;

a strip line electrically connected to one side of the feeding part, and formed in a first-axis direction and a second-axis direction perpendicular to the first-axis direction;

a dielectric antenna formed by a metal pattern on a dielectric structure disposed on the main board, wherein a first metal pattern and a second metal pattern formed on the side of the dielectric structure are electrically connected to grounds in the vicinity of the feeding part and the strip line, respectively.

17. The antenna system of claim 16, wherein the dielectric antenna includes:

a front metal pattern formed on the front of the dielectric structure;

the first metal pattern formed on a first side protruding from the dielectric structure; and the second metal pattern formed on a second side of the dielectric structure, wherein a conductive line corresponding to an end of the second metal pattern is connected to an end of a strip line through a capacitor.

18. The antenna system of claim 17, wherein the strip line includes:

a first strip line of a predetermined width and a predetermined length formed in the first-axis direction; and a second strip line formed to extend a predetermined length in the second-axis direction corresponding to two opposite sides from an end of the first strip line, wherein the second metal pattern is connected to the front metal pattern and formed in the form of a rectangular patch of a predetermined width and a predetermined length, an end of the rectangular patch connected to an end of the second metal pattern is formed as a conductive line, and both sides of the conductive line are formed as an inset structure which is formed by removing the metal pattern by a predetermined length and a predetermined width.

19. The antenna system of claim 16, wherein the dielectric antenna is a first dielectric antenna formed on one side separated from the main board, and placed adjacent to a first antenna operating in a 5G frequency band, wherein the first dielectric antenna operates as a FIFA (planar inverted F) antenna by a metal pattern formed on the front and side of the dielectric structure, and the dielectric antenna further includes a second dielectric antenna placed adjacent to the first dielectric antenna, with a loop-shaped front metal pattern formed on the front of the dielectric structure, wherein, in the second dielectric antenna, a feeding part electrically connected to one side of the front metal pattern is formed on a side inside the dielectric structure, and two opposite sides of the front metal pattern where the feeding part is not formed are electrically connected to a ground.

20. The antenna system of claim 16, wherein the dielectric antenna is a third dielectric antenna formed on the other side separated from the main board, and placed adjacent to a second antenna operating in a 5G frequency band, wherein the third dielectric antenna operates as a FIFA (planar inverted F) antenna by a metal pattern formed on the front and side of the dielectric structure, and a V2X feeding part for feeding a V2X antenna is formed on the side of the dielectric structure where the first metal pattern and the second metal pattern are not formed, and the dielectric antenna further includes a fourth dielectric antenna placed adjacent to the third dielectric antenna, with a loop-shaped front metal pattern formed on the front of the dielectric structure, wherein, in the fourth dielectric antenna, a feeding part electrically connected to one side of the front metal pattern is formed on a side inside the dielectric structure, and two opposite sides of the front metal pattern where the feeding part is not formed are electrically connected to a ground.

* * * * *